US008964552B2

(12) United States Patent
Muraoka et al.

(10) Patent No.: US 8,964,552 B2
(45) Date of Patent: Feb. 24, 2015

(54) BASE STATION, METHOD FOR CONTROLLING BASE STATION, CONTROL PROGRAM, AND MOBILE STATION

(75) Inventors: Kazushi Muraoka, Minato-ku (JP); Yasuhiko Matsunaga, Minato-ku (JP); Masayuki Ariyoshi, Minato-ku (JP); Toshifumi Nakamura, Minato-ku (JP)

(73) Assignee: NEC Corporation, Tokyo (JP)

( * ) Notice: Subject to any disclaimer, the term of this patent is extended or adjusted under 35 U.S.C. 154(b) by 195 days.

(21) Appl. No.: 13/259,046

(22) PCT Filed: Mar. 15, 2010

(86) PCT No.: PCT/JP2010/054752
§ 371 (c)(1),
(2), (4) Date: Nov. 14, 2011

(87) PCT Pub. No.: WO2010/110189
PCT Pub. Date: Sep. 30, 2010

(65) Prior Publication Data
US 2012/0063317 A1    Mar. 15, 2012

(30) Foreign Application Priority Data

Mar. 25, 2009 (JP) ................................. 2009-073049

(51) Int. Cl.
*G01R 31/08* (2006.01)
*H04W 52/02* (2009.01)
*H04B 1/04* (2006.01)

(52) U.S. Cl.
CPC ...... *H04W 52/0206* (2013.01); *H04W 52/0258* (2013.01); *H04B 1/0475* (2013.01); *H04W 52/0216* (2013.01)
USPC .......................................... 370/235; 370/252

(58) Field of Classification Search
USPC .......................... 370/235, 252, 328, 331, 338
See application file for complete search history.

(56) References Cited

U.S. PATENT DOCUMENTS

| | | | | |
|---|---|---|---|---|
| 5,826,218 A | * | 10/1998 | Khafizov et al. | 702/179 |
| 5,841,768 A | * | 11/1998 | Ozluturk et al. | 370/335 |
| 6,112,104 A | * | 8/2000 | Saario et al. | 455/561 |
| 6,549,529 B1 | * | 4/2003 | Drabeck et al. | 370/347 |
| 6,788,729 B1 | * | 9/2004 | Posti | 375/133 |
| 7,103,314 B2 | * | 9/2006 | Li | 455/41.2 |
| 7,173,904 B1 | * | 2/2007 | Kim | 370/230 |
| 7,209,433 B2 | * | 4/2007 | Scarpa | 370/206 |
| 7,676,236 B2 | * | 3/2010 | Nanda et al. | 455/509 |
| 7,894,331 B2 | * | 2/2011 | Sadek et al. | 370/210 |

(Continued)

FOREIGN PATENT DOCUMENTS

| | | |
|---|---|---|
| JP | 10-023519 A | 1/1998 |
| JP | 2001-333458 A | 11/2001 |

(Continued)

*Primary Examiner* — Ricky Ngo
*Assistant Examiner* — Christine Ng
(74) *Attorney, Agent, or Firm* — Sughrue Mion, PLLC

(57) ABSTRACT

To provide a base station in which an electric power consumed in the base station can be suppressed and an electromagnetic wave interference between the base stations can be avoided, a method for controlling a base station, a control program, and a mobile station. The base station includes storage means, traffic history generation means for measuring a traffic of the base station for each unit time and storing it in the storage means as a traffic history, and control means for controlling transmission of a control signal based on the traffic history.

11 Claims, 23 Drawing Sheets

(56) References Cited

U.S. PATENT DOCUMENTS

| | | | |
|---|---|---|---|
| 8,199,848 B2 * | 6/2012 | Kwon et al. | 375/284 |
| 2007/0049203 A1 * | 3/2007 | Dillon et al. | 455/63.4 |
| 2008/0113674 A1 * | 5/2008 | Baig | 455/456.3 |
| 2008/0299979 A1 * | 12/2008 | Ko et al. | 455/442 |
| 2011/0098075 A1 * | 4/2011 | Bienas et al. | 455/517 |

FOREIGN PATENT DOCUMENTS

| | | |
|---|---|---|
| JP | 2002-152129 A | 5/2002 |
| JP | 2003-037553 A | 2/2003 |
| JP | 2003-037555 A | 2/2003 |
| JP | 2007-068095 A | 3/2007 |

\* cited by examiner

BASE STATION, METHOD FOR CONTROLLING BASE STATION, CONTROL PROGRAM, AND MOBILE STATION

CROSS REFERENCE TO RELATED APPLICATIONS

This application is a National Stage of International Application No. PCT/JP2010/054752 filed Mar. 15, 2010, claiming priority based on Japanese Patent Application No. 2009-073049 filed May 25, 2009, the contents of all of which are incorporated herein by reference in their entirety.

TECHNICAL FIELD

The present invention relates to a base station, a method for controlling a base station, a control program, and a mobile station.

BACKGROUND ART

In a mobile communication system and especially in a cellular system, a wide communicable service area is secured by arranging a cover area of a base station whose cell radius is different from each other so that the cover areas overlap each other. However, when the cover areas of the base stations overlap each other, the signals of the base stations interfere with each other and whereby there is a risk of decrease in line capacity. Additionally, a probability of existence of the base station which has no mobile station in the cover area of the cell rises with the increase of the number of the base stations. Although such base station is not used, it continues the operation and consumes an electric power needlessly.

Therefore, a technology for avoiding interference and reducing the consumed electric power in a mobile communication system is proposed. For example, a technology in which a base station monitors a downlink signal transmitted by another base station, transmission from the base station is stopped or started by considering a traffic condition of the another base station and a received power, and whereby the number of base stations operating in a low traffic state is reduced and interference to the neighboring base station is reduced is disclosed in patent document 1.

As the related art, in patent document 2, there is described a base station resource control unit which determines whether to increase/decrease a base station wireless communication unit or maintain a current status, based on information (traffic volume and usage situation) registered in an information management table. This base station resource control unit performs ON/OFF control of supplying power to each base station wireless communication unit based on the above-mentioned determination result.

Additionally, as the related art, in patent document 3, there is described a network management device which compares current traffic information and past traffic information with subscriber terminal position information that are accumulated and stored in a traffic information database and a subscriber position information database and estimates near future traffic information required for reallocation of a network resource.

Further, as the related art, in patent document 4, there is shown that when the resource of a service is assigned, a daily average traffic trend chart in which classification is performed for each service, each weekday, holiday, or day of the week, each month, or simply, each day, or the like is held in a base station or a device for controlling the base station as data as necessary.

PRIOR ART DOCUMENT

Patent document

[Patent document 1] Japanese Patent Application Laid-Open No. 2003-037555
[Patent document 2] Japanese Patent Application Laid-Open No. 2007-068095
[Patent document 3] Japanese Patent Application Laid-Open No. 2003-037553
[Patent document 4] Japanese Patent Application Laid-Open No. 2001-333458

BRIEF SUMMARY OF THE INVENTION

Problems to be solved by the invention

In the invention described in patent document 1, the base station returns to an active state (a state in which a control signal is transmitted) from a sleep state (a state in which transmission of a control signal is stopped) when a condition in which a traffic of an adjacent base station is high is satisfied. However, a mobile station which should actually perform a handover from the adjacent base station to the base station does not always exist even when the traffic of the adjacent base station becomes high. Therefore, the base station disclosed in patent document 1 returns to the active state in vain even though the mobile station which should perform the handover from the adjacent base station to the base station does not exist. Therefore, there is a risk in which the electric power is wasted. Namely, by the technology disclosed in patent document 1, the number of the base stations that are activated in vain even in a low traffic state cannot be sufficiently reduced. As a result, the interference between adjacent cells and the power consumption cannot be sufficiently reduced.

Further, in patent documents 2 to 4, only technology for efficiently allocating the network (service) resource is disclosed and a technology for efficiently performing a state transition (that is, a transition from a state in which transmission of a control signal is stopped to a state in which the control signal is transmitted or a reverse transition) of the base station is not disclosed. Namely, by using the technology disclosed in patent documents 2 to 4, the number of the base stations that are activated in vain cannot be sufficiently reduced. As a result, the interference between adjacent cells and the power consumption cannot be sufficiently reduced.

The present invention is made to solve the above-mentioned problem. The object of the present invention is to provide a base station in which power consumption can be suppressed and the electromagnetic wave interference between the base stations can be avoided, a method for controlling a base station, a control program, and a mobile station.

Means For Solving The Problems

A base station of the present invention includes storage means, traffic history generation means for measuring a traffic of the base station for each unit time and storing it in the storage means as a traffic history, and control means for controlling transmission of a control signal based on the traffic history.

Additionally, the base station of the present invention includes a plurality of wireless communication means for performing a communication process for each of a plurality of wireless frequency bands and each wireless communication means includes the traffic history generation means for measuring the traffic of each wireless communication means for each unit time and storing it in predetermined storage means as the traffic history, and control means for controlling the transmission of the control signal for each wireless communication means based on the traffic history.

Further, a method for controlling a base station of the present invention comprises the steps of: measuring a traffic of the base station for each unit time, storing it in predetermined storage means as a traffic history, and controlling transmission of a control signal based on the traffic history.

Additionally, the method for controlling a base station of the present invention is a method for controlling a base station that includes a plurality of wireless communication means for performing a communication process for each of a plurality of wireless frequency bands and comprises the steps of: measuring a traffic of each wireless communication means for each unit time, storing it in predetermined storage means as a traffic history, and controlling transmission of a control signal for each wireless communication means based on the traffic history.

Further, a control program of the present invention causes a computer of a base station to perform a process in which a traffic of the base station is measured for each unit time, it is stored in predetermined storage means as a traffic history, and transmission of a control signal is controlled based on the traffic history.

Additionally, the control program of the present invention is a control program which causes a computer of a base station having a plurality of wireless communication means for performing a communication process for each of a plurality of wireless frequency bands to perform a process in which a traffic of each wireless communication means is measured for each unit time, it is stored in predetermined storage means as a traffic history, and transmission of a control signal is controlled based on the traffic history for each wireless communication means.

Further, a mobile station of the present invention is a mobile station which can communicate with a base station and receives a control signal transmitted by the base station based on a traffic history, wherein a traffic in the base station is measured for each unit time and it is stored in predetermined storage means of the base station as the traffic history.

Advantage Of The Invention

By using the present invention, an electric power consumed in the base station is suppressed and electromagnetic wave interference between base stations is avoided.

MODE FOR CARRYING OUT THE INVENTION

[First Exemplary Embodiment]

Figure 1:
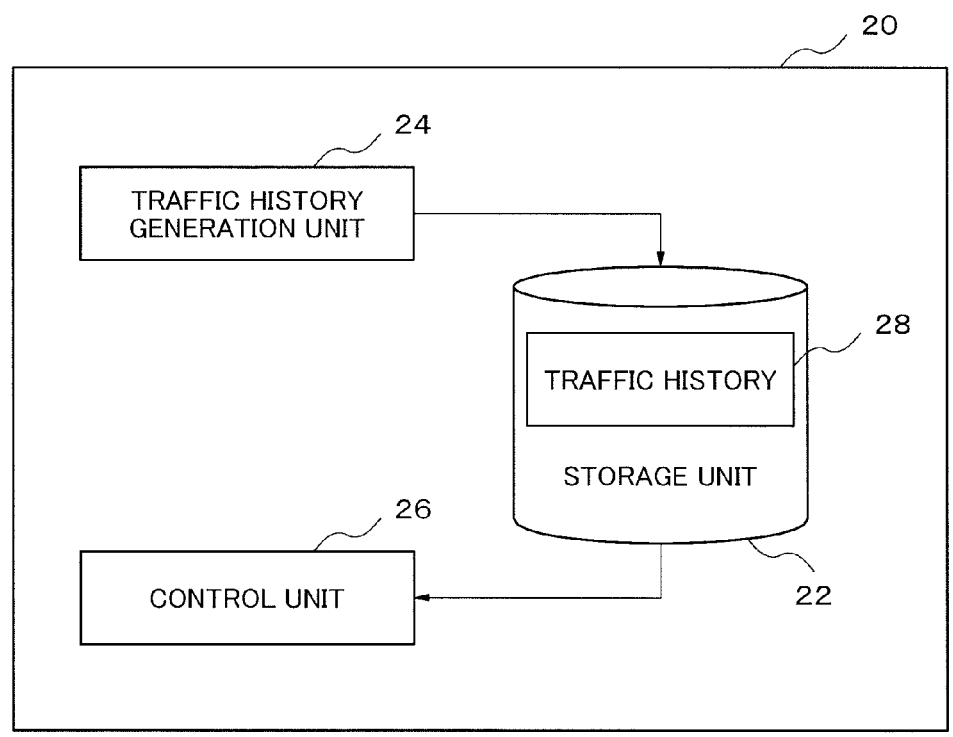
FIG. 1 is a block diagram for explaining an example of a configuration of a base station according to a first exemplary embodiment of the present invention.

FIG. 1 is a block diagram for explaining an example of a configuration of a base station 20 according to a first exemplary embodiment of the present invention.

The base station 20 includes a storage section 22, a traffic history generation section 24, and a control section 26. The traffic history generation section 24 measures a traffic of the base station 20 for each unit time and stores it in the storage section 22 as a traffic history 28. The control section 26 controls transmission of a control signal based on the traffic history 28.

By the way, usually, the base station 20 cannot communicate with a mobile station in a state in which the transmission of the control signal is stopped. Therefore, the base station 20 cannot specify the current traffic of the mobile station located in the vicinity of the base station 20. Accordingly, in such case, generally, a method in which the base station 20 is activated constantly in order to avoid a communication impossible state may be envisaged. However, there is a case in which it is not necessary to activate the base station 20. For example, there is a case in which when the traffic in the vicinity of the base station 20 is lower than a predetermined threshold value (for example, although a mobile station which can be connected to the base station 20 exists, the number of the mobile stations is small), another base station located in the vicinity of the base station 20 (for example, another base station having a cell, wherein the cell and a part of the cell of the base station 20 overlap each other or another base station having a cell that covers the whole cell of the base station 20) can accommodate those mobile stations.

In contrast, in the base station 20 of the first exemplary embodiment described above, the traffic history generation section 24 can measure the traffic of the base station 20 for each unit time and store it in the storage section 22 as the traffic history 28 in a state in which a control signal is transmitted (in other words, in a state in which it can be connected to the mobile station). On the other hand, the control section 26 can start to transmit the control signal based on the traffic history 28, for example, in a state in which the transmission of the control signal is stopped (in other words, in a state in which it cannot be connected to the mobile station). For example, when the current traffic in the vicinity of the base station 20 that is estimated based on the traffic history 28 is higher than a predetermined threshold value, the control section 26 can start to transmit the control signal.

Namely, the base station 20 of the first exemplary embodiment is not activated in vain in spite of a low traffic state. Therefore, by using this exemplary embodiment, the electric power consumed in the base station can be suppressed and the electromagnetic wave interference between the base stations can be avoided or suppressed.

A plurality of exemplary embodiments of the present invention will be described specifically below.

Further, in each of the following exemplary embodiments, an explanation is given for a case in which a pilot signal that is a common control signal of which a signal having a predetermined pattern is continuously and repeatedly transmitted is used as an example of the control signal.

[Second Exemplary Embodiment]

Figure 2:
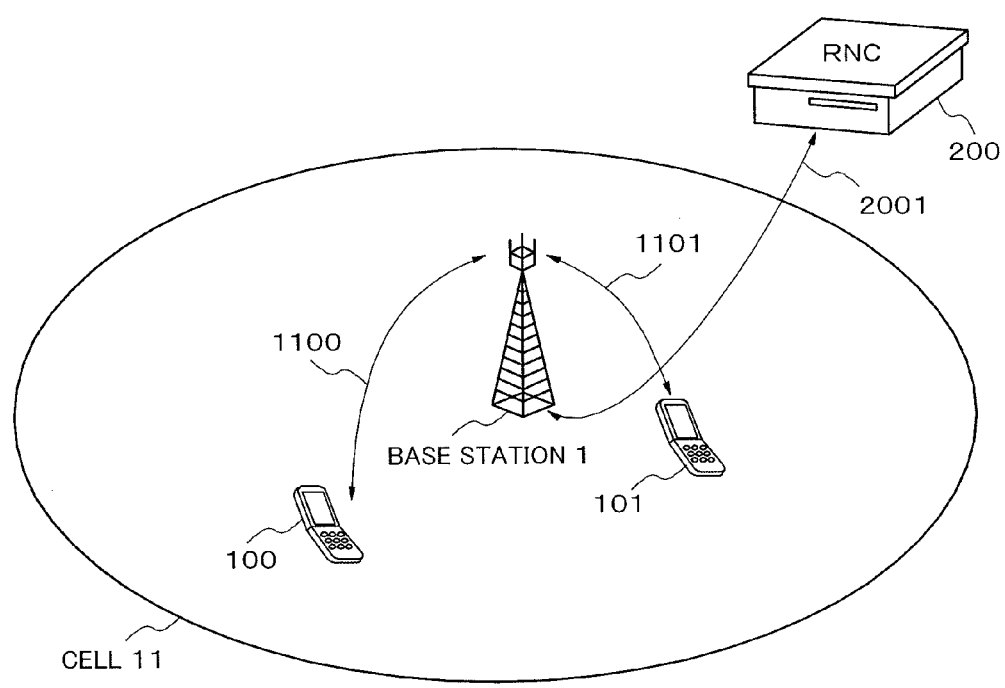
FIG. 2 is a view showing a configuration of an example of a wireless communication system according to a second exemplary embodiment of the present invention.

FIG. 2 is a view showing a configuration of an example of a wireless communication system according to a second exemplary embodiment of the present invention. This wireless communication system includes a base station 1, a plurality of mobile stations 100 and 101, and a wireless network control device (hereinafter, referred to as RNC (Radio Network Controller)) 200. The base station 1 transmits the pilot signal to the mobile station located in a cell 11. When the mobile stations 100 and 101 receive the pilot signal, the mobile stations 100 and 101 communicate with the base station 1 through wireless links 1100 and 1101 based on each received pilot signal, respectively. The RNC 200 is connected to the base station 1 through a line 2001 and manages the base station 1. Here, a wired line or a wireless line can be used for the line 2001. In the explanation described below, the wired line is used for the line 2001.

Figure 3:
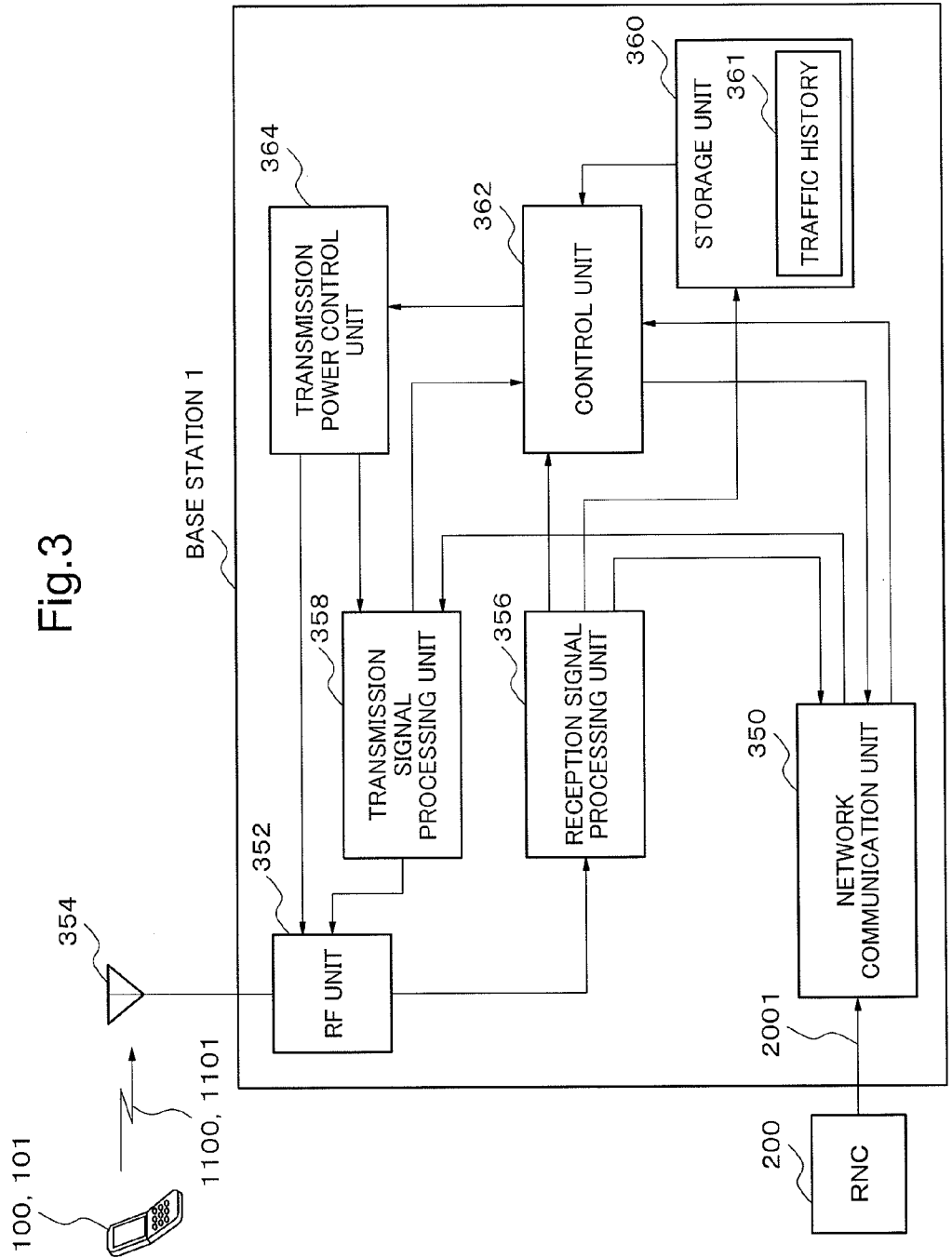
FIG. 3 is a block diagram for explaining an example of a configuration of a base station shown in FIG. 2.

FIG. 3 is a block diagram for explaining an example of a configuration of the base station 1. The base station 1 includes a network communication section 350, an RF (Radio Frequency) section 352, an antenna 354, a reception signal processing section 356 (traffic history generation means), a transmission signal processing section 358, a storage section 360 (storage means), a control section 362 (control means), and a transmission power control section 364.

The network communication section 350 communicates with the RNC 200 through the line 2001.

The RF section 352 communicate with the mobile stations 100 and 101 located in the cell 11 through the wireless links 1100 and 1101, respectively. The antenna 354 emits an electromagnetic wave into space in order to perform wireless communication with the mobile stations 100 and 101 or captures the electromagnetic wave propagated through space.

The reception signal processing section 356 processes the signal that is transmitted by the mobile stations 100 and 101 and received by the RF section 352. Additionally, the reception signal processing section 356 measures the traffic of the base station 1 for each unit time and stores it in the storage section 360 as a traffic history 361. Here, for example, a minimum transition time in a transition between an active state St_11 and an electromagnetic wave transmission stop state St_12 that are described below can be used as the "unit time" mentioned above. The "unit time" can be arbitrarily set to for example, 10 minutes, 30 minutes, 1 hour, or the like. Further, the "unit time" is determined in advance before the traffic is measured. The "unit time" can be changed arbitrarily. The reception signal processing section 356 has time measurement means (not shown) and recognizes the elapse of the "unit time" based on a result of time measurement. The reception signal processing section 356 notifies the control section 362 of a part of the measured traffic.

Here, the "traffic" indicates for example, "the number of the mobile stations" which have established the connection to the base station 1 or "an amount of user data" in the mobile station which has established the connection to the base station 1. Further, "the estimated current traffic in the vicinity of the base station 1" described below is only an estimated value and is not the current number of the mobile stations which have established the connection to the base station 1 or the current amount of user data.

Figure 4:
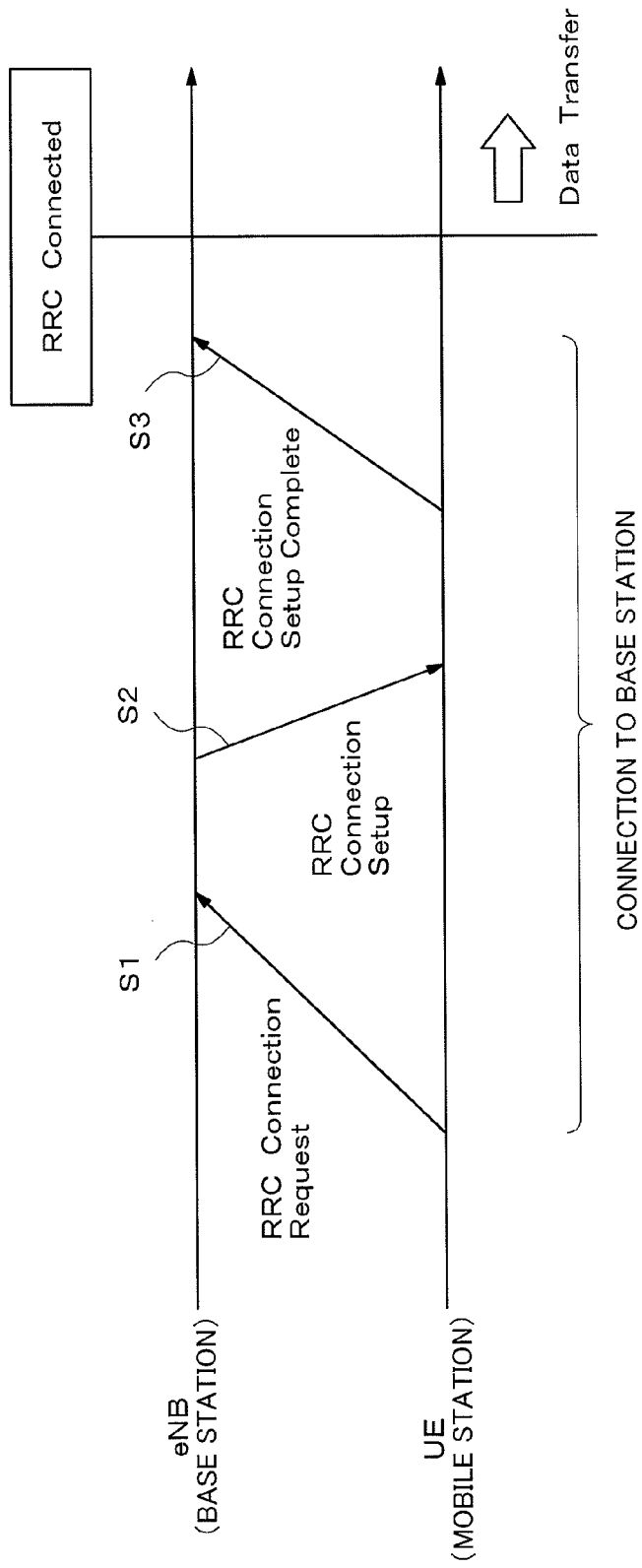
FIG. 4 is a diagram showing an example of "establishment of connection to a base station" and a sequence diagram showing an example of establishment of connection of an eNB (evolved NodeB/ base station) and a UE (User Equipment/ mobile station) in an LTE (Long Term Evolution).

Here, an example of "establishment of connection to the base station 1" will be described below. FIG. 4 is a sequence diagram showing an example of establishment of connection of an eNB (evolved NodeB/base station) and a UE (User Equipment/mobile station) in an LTE (Long Term Evolution). First, the UE secures a radio resource for performing communication with the eNB (in this case, it corresponds to a base station which performs an activation control) by using a random access channel. Next, the UE transmits a connection request (RRC (Radio Resource Control) Connection Request) to the eNB (step S1). When the eNB receives the connection request, it transmits a connection notification (RRC Connection Setup) to the UE (step S2). When the UE receives the connection notification, it transmits a connection completion (RRC Connection Setup Complete) to the eNB (step S3). By performing the above-mentioned processes, an RRC Connected (connection establishment) mode is entered. Of course, "the establishment of connection to the base station 1" is not limited to the above.

The explanation returns to FIG. 3. The transmission signal processing section 358 processes a signal transmitted to the mobile stations 100 and 101 and outputs the processed signal to the RF section 352. The storage section 360 stores the traffic history 361.

The control section 362 controls transmission of a pilot signal (in other words, controls the state transition of the base station 1) based on information (for example, information about whether or not the number of the mobile stations connecting to the base station 1 is smaller than a predetermined threshold value) from the reception signal processing section 356. Additionally, the control section 362 controls the transmission of the pilot signal based on the traffic history 361 stored in the traffic storage section 360.

For example, when the control section 362 receives information indicating that the number of the mobile stations connecting to the base station 1 is smaller than the predetermined threshold value from the reception signal processing section 356, it stops the transmission of the pilot signal (in other words, the state of the base station 1 is changed from the active state St_11 to the electromagnetic wave transmission stop state St_12 that are described below). Additionally, for example, the control section 362 estimates the current traffic in the vicinity of the base station 1 from the traffic history 361 and starts to transmit the pilot signal (in other words, the state of the base station 1 is changed from the electromagnetic wave transmission stop state St_12 to the active state St_11) when the estimated traffic exceeds the predetermined threshold value. The control section 362 instructs the transmission power control section 364 to stop and start the transmission of the pilot signal. The transmission power control section 364 performs on-off control of a power supply of the transmission signal processing section 358, transmission power control in the RF section 352, and on-off control of a power supply thereof based on the instruction from the control section 362.

Figure 5:
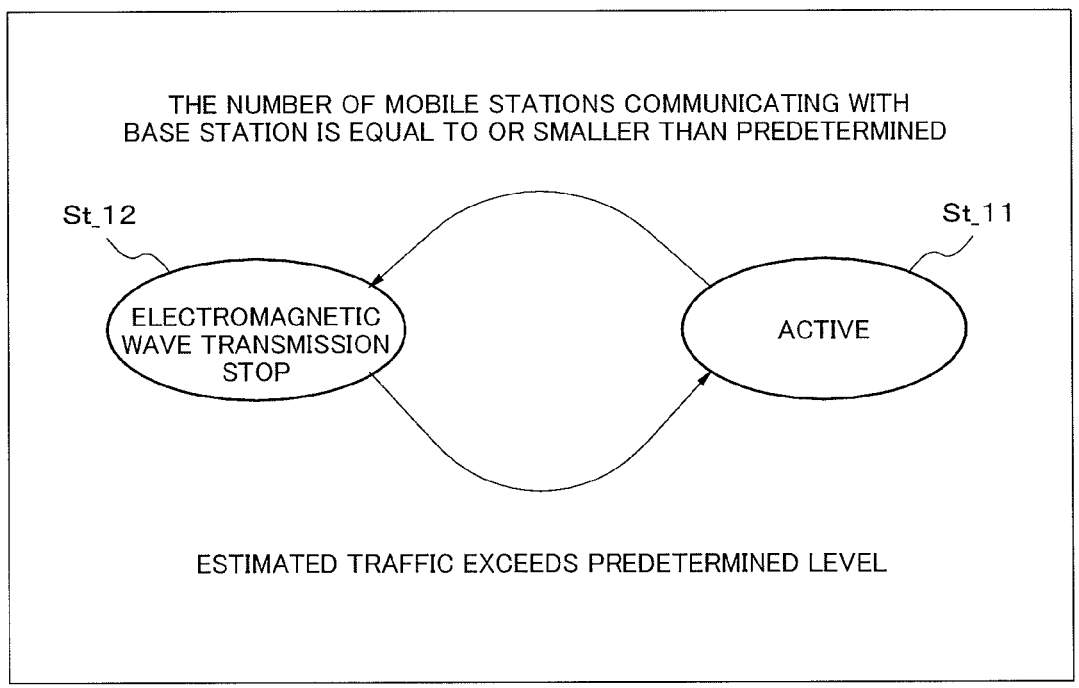
FIG. 5 is a view for explaining an example of a state transition of a base station shown in FIG. 2.

FIG. 5 is a view for explaining an example of a state transition of the base station 1. The base station 1 has two operation states. A first operation state is the active state St_11 in which the base station 1 can transmit/receive a wireless signal to/from the mobile station that exists in the cell 11 (in FIG. 1, for example, the mobile station 100). A second operation state is the electromagnetic wave transmission stop state St_12 in which the transmission of the wireless signal from the base station 1 to the mobile station is stopped and the base station 1 cannot perform wireless communication with the mobile station located in the cell 11.

Whenever the predetermined condition is met, the operation state of the base station 1 is changed from one state to the other state. The transition condition at which the state of the base station 1 is changed from the active state St_11 to the electromagnetic wave transmission stop state St_12 is for example, a case in which the number of the mobile stations communicating with the base station 1 is equal to or smaller than the predetermined number (in this case, a case in which the number of the mobile stations communicating with the base station 1 is "0" is included). On the other hand, the transition condition at which the state of the base station 1 is changed from the electromagnetic wave transmission stop state St_12 to the active state St_11 is for example, a case in which the current traffic of the base station 1 that is estimated from the traffic history 361 exceeds the predetermined threshold value.

Further, "the stop of the wireless signal transmitted from the base station 1 to the mobile station" in the electromagnetic wave transmission stop state St_12 means specifically, for example, a state in which a power supply and a transmission function of the transmission signal processing section 358 or the RF section 352 are turned off by the transmission power control section 364 of the base station 1 and whereby the transmission (for example, the pilot signal that is the control signal) from the base station 1 to the mobile station (for example, the mobile station 100 shown in FIG. 1) is stopped.

Figure 6:
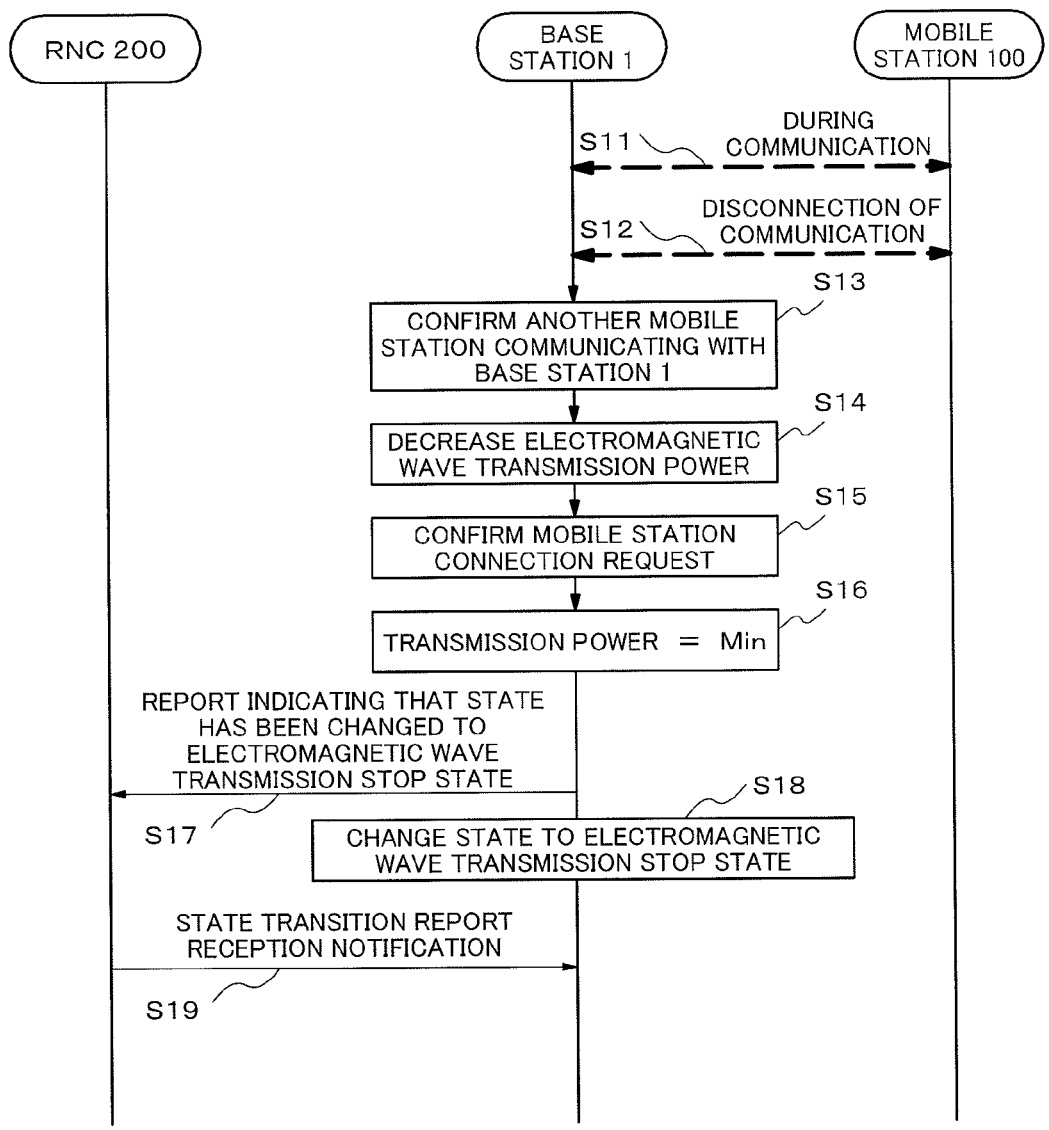
FIG. 6 is a sequence chart showing an example of operation of a wireless communication system when a state of a base station shown in FIG. 2 is changed from an active state to an electromagnetic wave transmission stop state.

FIG. 6 is a sequence chart showing an example of operation of a wireless communication system when the state of the base station 1 is changed from the active state St_11 to the electromagnetic wave transmission stop state St_12. The sequence described in FIG. 6 will be described below with reference to FIG. 2 and FIG. 3 as necessary.

First, the base station 1 communicates with for example, the mobile station 100 shown in FIG. 2 in the cell 11 (step S11). Here, for any reasons, the mobile station 100 performs a communication disconnection process to the base station 1 (step S12). The base station 1 which receives a communication disconnection request from the mobile station 100 confirms whether or not the mobile station during communication other than the mobile station 100 exists in the cell 11 of the base station 1 (step S13). When it is confirmed that the mobile station during communication other than the mobile station 100 does not exist, the base station 1 gradually decreases the transmission power of the pilot signal (for example, 1 dB per 0.1 seconds) (step S14).

While the transmission power is decreased, the base station 1 confirms whether or not a new connection request from the mobile station arises in the cell 11 of the base station 1 (step S15). When the new connection request does not arise, the base station 1 repeatedly performs the processes of step S14 and step S15 until the transmission power is decreased by a predetermined amount (for example, 20 dB) (namely, until the transmission power reaches a level that is one hundredth part of the transmission power in the active state St_11). When the transmission power of the pilot signal is decreased to the predetermined threshold value (step S16), the base station 1 reports to the RNC 200 that the state of the base station 1 is changed to the electromagnetic wave transmission stop state St_12 (step S17). The state of the base station 1 which transmits the state transition report is changed to the electromagnetic wave transmission stop state St_12 (namely, the transmission of the electromagnetic wave to the mobile station is stopped) (step S18).

The RNC 200 transmits a notification indicating that the state report of the base station 1 has been received by the RNC 200 to the base station 1 (step S19).

Figure 7:
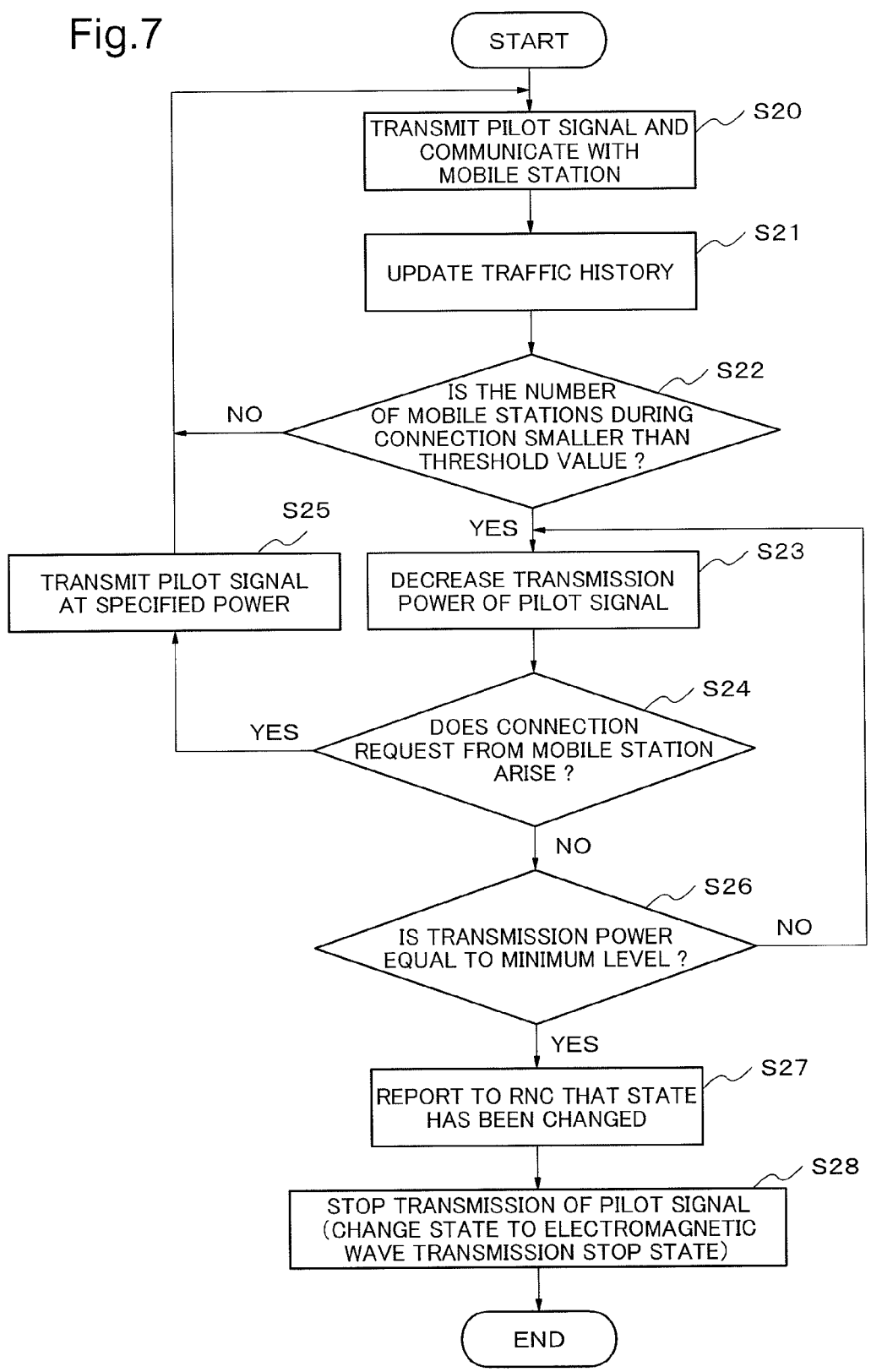
FIG. 7 is a flowchart explaining an example of operation of a base station when a state of a base station shown in FIG. 2 is changed from an active state to an electromagnetic wave transmission stop state.

FIG. 7 is a flowchart explaining an example of operation of the base station 1 when the state of the base station 1 is changed from the active state St_11 to the electromagnetic wave transmission stop state St_12. A time at which the process shown in the flow is called in the base station 1 is a time at which the state of the base station 1 has been changed to an active St_11.

In an active state St_1, the transmission signal processing section 358 of the base station 1 transmits the pilot signal to the mobile station located in the cell 11 via the RF section 352 at a predetermined power and on the other hand, the reception signal processing section 356 receives the predetermined signal from the mobile station located in the cell 11 via the RF section 352 (step S20). The reception signal processing section 356 measures the traffic of the base station 1 for each unit time and updates the traffic history 361 stored in the storage section 360 based on the traffic information measured for each unit time (for example, the newly measured data is added) (step S21). Further, the reception signal processing section 356 determines whether or not the number of the mobile stations connecting to the base station 1 is smaller than the predetermined threshold value (step S22) and transmits the determination result to the control section 362.

When the number of the mobile stations connecting to the base station 1 is equal to or greater than the predetermined number ("No" determination in step S22), the control section 362 maintains the operation state of the base station 1 in an active state St_1. Namely, the processes from step S20 to step S22 are repeated.

On the other hand, when the number of the mobile stations connecting to the base station 1 is smaller than the predetermined number ("Yes" determination in step S22), the control section 362 issues an instruction to gradually decrease the transmission power of the control signal including the pilot signal to the transmission power control section 364. The transmission power control section 364 which receives the instruction to decrease the transmission power outputs an instruction to gradually decrease the transmission power to the transmission signal processing section 358 (step S23). Here, the transmission power control section 364 performs a process for decreasing the transmission power in which the transmission power of the transmission signal processing section 358 is decreased for example, by 20 dB at a rate of 1 dB per 0.1 seconds (namely, until the transmission power reaches a level that is one hundredth part of the transmission power in the active state St_11).

While the transmission signal processing section 358 decreases the transmission power by the control of the transmission power control section 364, the reception signal processing section 356 confirms whether or not a new connection request from the mobile station arises in the cell 11 of the base station 1 (step S24). While the transmission power is decreased, when the new connection request from the mobile station arises in the cell 11 ("Yes" determination in step S24), the reception signal processing section 356 outputs control information or an instruction to increase the transmission power up to a specified value to the control section 362. By this control information or the instruction, the control section 362 issues an instruction to increase the transmission power of the control signal including the pilot signal in the transmission signal processing section 358 up to the specified value to the transmission power control section 364. By this, the transmission power control section 364 controls the transmission signal processing section 358 to increase the transmission power (step S25). The control section 362 maintains the operation state of the base station 1 in the active state St_1. Namely, the processes from step S20 to step S24 are repeated.

Meanwhile, while the transmission power is decreased, when the new connection request from the mobile station does not arise in the cell 11 ("No" determination in step S24), the transmission signal processing section 358 determines whether or not the transmission power is lowered to the predetermined threshold value (step S26). When it has just been lowered to the threshold value ("Yes" determination in step S26), the transmission signal processing section 358 notifies the control section 362 of information indicating that the transmission power has been lowered to the threshold value. When the control section 362 receives the notification, it reports to the RNC 200 via the network communication section 350 that the state of the base station 1 is changed to the electromagnetic wave transmission stop state St_12 (step S27). After that, the control section 362 issues an instruction to stop the transmission of the pilot signal in the transmission signal processing section 358 (to change the operation state of the base station 1 to the electromagnetic wave transmission stop state St_12) to the transmission power control section 364 (step S28).

Here, the RNC 200 transmits a notification indicating that the above-mentioned state transition report from the base station 1 has been received by the RNC 200 to the base station 1. The RNC 200 instructs another base station located in the vicinity of the base station 1 to delete the base station 1 from a measurement cell set. Here, the measurement cell set is a list of the cells (base stations) that are targets for which the received power of the pilot signal is measured by the mobile station. The above-mentioned another base station which receives the instruction updates the measurement cell set held therein. Specifically, the above-mentioned another base station deletes the base station 1 from the measurement cell set held therein.

Further, in the determination of step S22, when the number of the mobile stations connecting to the base station 1 is smaller than the predetermined threshold value but the number of it is not "0" (namely, one or more mobile stations connecting to the base station 1 exist), the state of the base station 1 can be changed from the active state St_1 to the electromagnetic wave transmission stop state St_2, for example, by performing a communication handover to a neighboring base station (not shown) of the base station 1 in order to intentionally create a situation in which the mobile station communicating with the base station 1 does not exist.

A transmission power decreasing process in the base station 1 is not limited to the above. For example, the transmission power control section 364 or the transmission signal processing section 358 in the base station 1 can decrease the transmission power to the predetermined value in one shot instead of gradual reduction. In the case, at least a process of step S24 in FIG. 6 can be omitted and in some cases, a process of step S26 can be omitted. Here, the above-mentioned "predetermined value" includes a state in which no signal is outputted at all, namely it includes "0" output power (for example, "0" watt).

Figure 8:
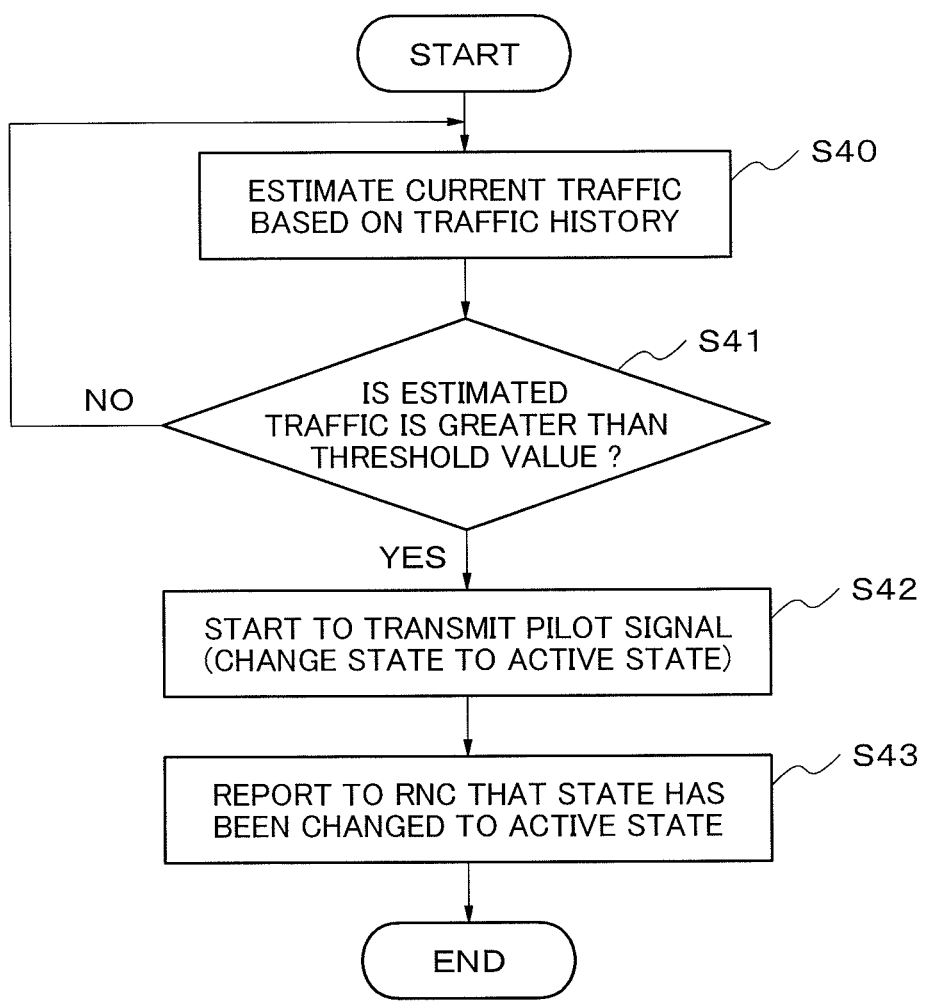
FIG. 8 is a flowchart showing an example of operation of a base station when a state of a base station shown in FIG. 2 is changed from an electromagnetic wave transmission stop state to an active state.

FIG. 8 is a flowchart showing an example of operation of the base station 1 when the state of the base station 1 is changed from the electromagnetic wave transmission stop state St_12 to the active state St_11. A time at which the process shown in a general flow is called in the base station 1 is a time at which the state of the base station 1 has been changed to the electromagnetic wave transmission stop state St_12.

The control section 362 of the base station 1 in the electromagnetic wave transmission stop state St_12 estimates the current traffic in the vicinity of the base station 1 based on the traffic history 361 (step S40). The control section 362 determines whether or not the estimated traffic exceeds the predetermined threshold value (step S41). When the estimated traffic is lower than the predetermined threshold value ("No" determination in step S41), the control section 362 estimates a traffic that is obtained at the time of the next estimation timing (namely, a process of step S40 is performed again).

On the other hand, when the current traffic exceeds the predetermined threshold value ("Yes" determination in step S41), the control section 362 sets the state of the base station 1 to the active state St_11 (step S42). Specifically, the control section 362 issues an instruction to increase the transmission power of the control signal including the pilot signal in the transmission signal processing section 356 up to the specified value to the transmission power control section 364. The transmission power control section 364 controls the transmission signal processing section 358 to increase the transmission power. As a result, the transmission of the pilot signal is started. The control section 362 reports to the RNC 200 via the network communication section 350 that the state of the base station 1 has been changed to the active state St_11 (step S43).

The RNC 200 which receives the state transition report instructs another base station located in the vicinity of the base station 1 to add the base station 1 to the measurement cell set. The above-mentioned another base station that receives the instruction of addition instructs the mobile station connecting to the another base station to measure the received power of the pilot signal for not only the another base station but also the cell added to the measurement cell set and the mobile station measures the received power of the pilot signal according to the instruction.

In the wireless communication system of the second exemplary embodiment described above, the control section 362 of the base station 1 estimates the current traffic in the vicinity of the base station 1 from the traffic history 361 when the base station 1 is in the electromagnetic wave transmission stop state St_12 (namely, in a state in which the transmission of the pilot signal is stopped and communication with the mobile station cannot be performed) and starts to transmit the pilot signal when the estimated traffic exceeds the predetermined threshold value.

Namely, the base station 1 of the second exemplary embodiment is not activated in vain in spite of a low traffic state. Therefore, by using this exemplary embodiment, the electric power consumed in the base station can be suppressed and the electromagnetic wave interference between the base stations can be avoided or suppressed.

Here, when the predetermined condition is met (for example, when the number of the mobile stations connecting to the base station 1 is equal to or smaller than the threshold value) after the operation state of the base station 1 has been changed to the active state St_11, the base station 1 of the wireless communication system according to the second exemplary embodiment can perform a process in which the operation state of the base station 1 is changed from the active state St_11 to the electromagnetic wave transmission stop state St_12. Namely, the base station 1 has means (for example, the control section 362 and the transmission power control section 364) for stopping the transmission of the pilot signal when the above-mentioned predetermined condition is met after the base station 1 starts to transmit the pilot signal.

Thus, by performing the state transition control more carefully, the power consumed in the base station can be suppressed and the electric wave interference between the base stations can be avoided more surely.

Further, as an example of a method for estimating the current traffic in the vicinity of the base station 1 that is used in the control section 362, for example, the following methods can be used. An "average model" is a model in which a future traffic (in this exemplary embodiment, current traffic) is estimated by an average value of the traffic from the start of the observation to the present (in this exemplary embodiment, a time at which the operation state is changed to the electromagnetic wave transmission stop state St_12). A "moving average model" (MA (Moving Average) model) estimates the future traffic by using the average value of the traffic during a past fixed period of time. An "autoregressive model" (AR (Auto Regressive) model) is a model in which the future traffic is estimated by using a linear sum of the observed values of the traffic during a past fixed period of time. An "autoregressive moving average model" (ARMA (Auto Regressive/Moving Average) model) is a model in which the future traffic is estimated by combining the moving average (MA) model and the autoregressive (AR) model. An "autoregressive integrated moving average model" (ARIMA (Auto Regressive Integrated Moving Average) model) is a model in which the future traffic is estimated by using a linear sum of the observed values of the traffic during a past fixed period of time and errors. The current traffic in the vicinity of the base station 1 can be estimated by using Kalman filter model.

[Third Exemplary Embodiment]

Figure 9:
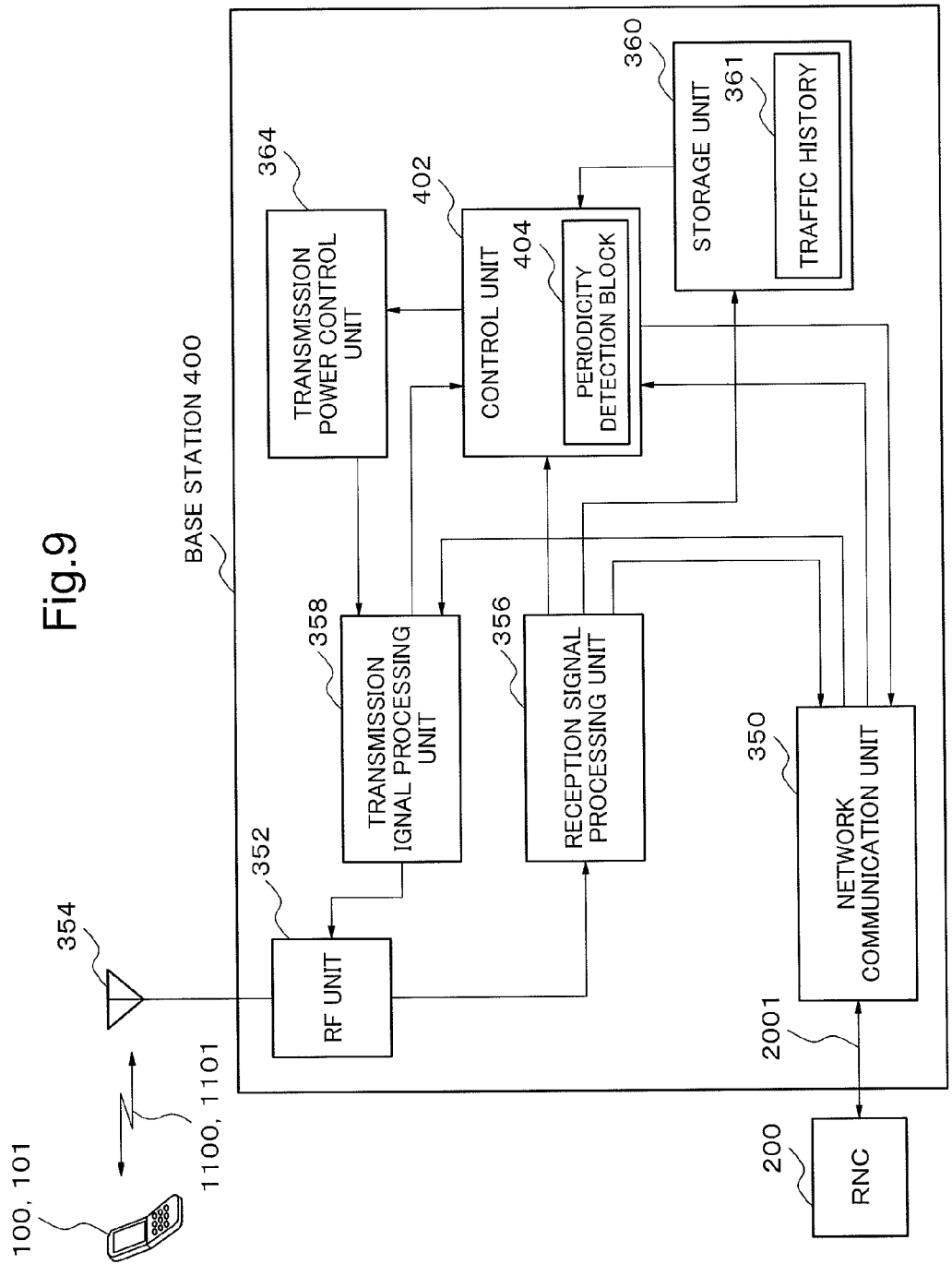
FIG. 9 is a block diagram for explaining an example of a configuration of a base station of which a wireless communication system according to a third exemplary embodiment of the present invention is composed.

FIG. 9 is a block diagram for explaining an example of a configuration of a base station 400 of which a wireless communication system according to a third exemplary embodiment of the present invention is composed. A configuration of a control section 402 of the base station 400 is different from the configuration of the control section 362 of the base station 1 of the second exemplary embodiment shown in FIG. 3. This is a difference between the base station 400 of this exemplary embodiment and the base station 1 of the second exemplary embodiment. A configuration and an operation of each of constituent elements other than this control section 402, that are the network communication section 350, the RF section 352, the antenna 354, the reception signal processing section 356, the transmission signal processing section 358, the storage section 360, and the transmission power control section 364 in the base station 400, are the same as those of each of constituent elements other than the control section 362 of the base station 1 shown in FIG. 3. Therefore, the description of them will be omitted.

The control section 402 has a periodicity detection block 404 (periodicity detection means). The periodicity detection block 404 specifies the periodicity of the traffic by referring to the traffic history 361 stored in the storage section 360, in other words, based on the temporal transition of the traffic. For example, the periodicity detection block 404 specifies a time zone and a day in which the change in traffic has a periodicity and an amount of traffic exceeds a predetermined one.

Figure 10:
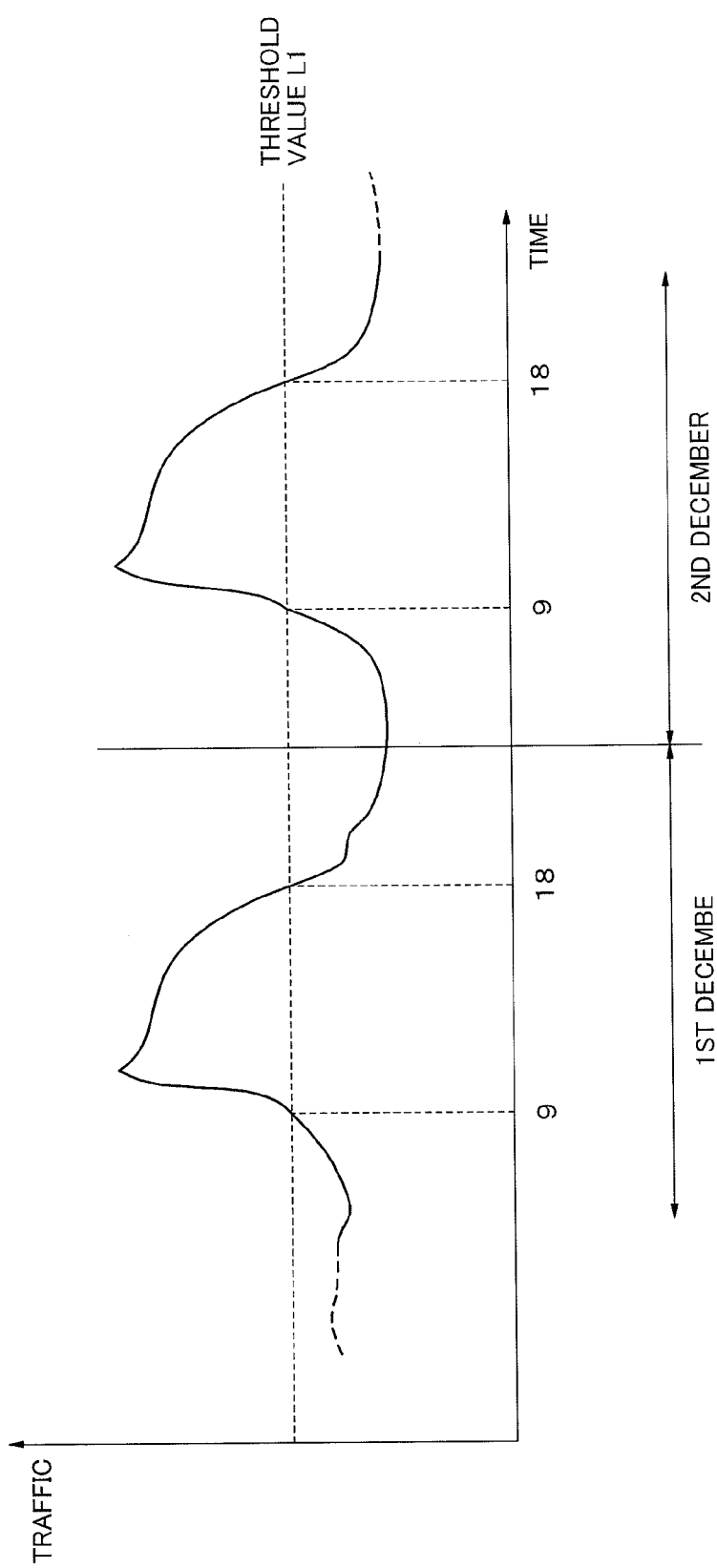
FIG. 10 is a graph showing a traffic transition of a base station shown in FIG. 9 for the past two days.

FIG. 10 is a graph showing a traffic transition (relationship between time transition and traffic) of the base station 400 for the past two days (for example, December 1st and December 2nd). Such data indicating the transition is stored in the traffic history 361. When the state of the base station 400 is changed to the electromagnetic wave transmission stop state St_12, the periodicity detection block 404 refers to the traffic history 361 and determines whether or not the change in traffic of the base station 400 has the periodicity. Specifically, for example, the periodicity detection block 404 recognizes that the traffic of the base station 400 is higher than a predetermined threshold value L1 in the period "from 9:00 to 18:00" from the above-mentioned data for the past 2 days. The periodicity detection block 404 sends this time information (9:00 to 18:00) to the control section 402 as a periodicity parameter. The control section 402 sets the state of the base station 400 to the active state St_11 in the period "from 9:00 to 18:00" in a predetermined future day (for example, December 3rd) based on this periodicity parameter. Specifically, the control section 402 issues an instruction to increase the transmission power of the control signal including the pilot signal in the transmission signal processing section 356 up to the specified value to the transmission power control section 364. The transmission power control section 364 controls the transmission signal processing section 358 to increase the transmission power. As a result, the transmission of the pilot signal is started.

As described above, the base station 400 of the third exemplary embodiment creates the periodicity parameter for the periodicity of the traffic change from the traffic history 361 and controls the transmission of the pilot signal based on this periodicity parameter. Specifically, for example, the base station 400 can specify a period in which the change in traffic has the periodicity and the amount of traffic is higher than the predetermined threshold value L1 from the traffic history 361 and transmit the pilot signal during the period (in other words, the state of the base station 400 can be changed to the active state St_11).

Namely, the base station 400 of the third exemplary embodiment is not activated in vain in spite of a low traffic state. Therefore, by using this exemplary embodiment, the electric power consumed in the base station can be suppressed and the electromagnetic wave interference between the base stations can be avoided or suppressed.

Moreover, the base station 400 can be certainly activated in a period in which it should be activated. Therefore, a state in which a load of another base station in the vicinity of the base station 400 (for example, another base station having a cell, wherein the cell and a part of the cell of the base station 400 overlap each other or another base station having a cell that covers the whole cell of the base station 400) exceeds the specified value (that is, the overflow of the base station) can be avoided. Consequently, performance of an entire wireless communication system can be improved.

Further, the periodicity detection process of the periodicity detection block 404 is performed not only in the electromagnetic wave transmission stop state St_12 but also in the active state St_11.

[Fourth Exemplary Embodiment]

Figure 11:
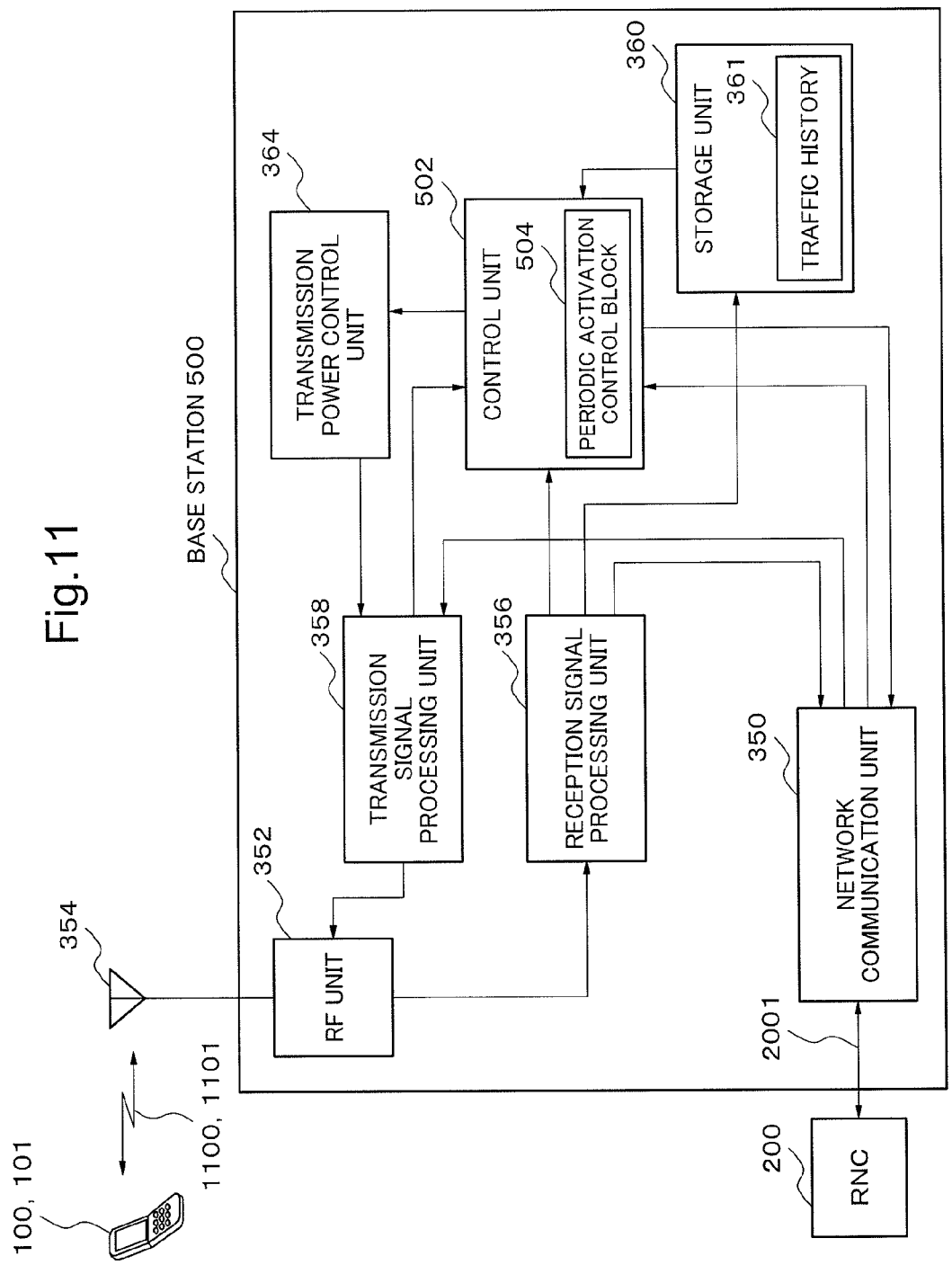
FIG. 11 is a block diagram for explaining an example of a configuration of a base station of which a wireless communication system according to a fourth exemplary embodiment of the present invention is composed.

FIG. 11 is a block diagram for explaining an example of a configuration of a base station 500 of which a wireless communication system according to a fourth exemplary embodiment of the present invention is composed. A configuration of a control section 502 of the base station 500 is different from the configuration of the control section 362 of the base station 1 of the second exemplary embodiment shown in FIG. 3. This is a difference between the base station 500 of this exemplary embodiment and the base station 1 of the second exemplary embodiment. A configuration of each of constituent elements other than this control section 502, that are the network communication section 350, the RF section 352, the antenna 354, the reception signal processing section 356, the transmission signal processing section 358, the storage section 360, and the transmission power control section 364, in the base station 500 is the same as that of each of constituent elements other than the control section 362 in the base station 1 shown in FIG. 3. An operation of each of constituent elements other than the reception signal processing section 356 in the base station 500 is the same as that of each of constituent elements other than the reception signal processing section 356 in the base station 1 shown in FIG. 3. Therefore, the description of them will be omitted.

The control section 502 has a periodic activation control block 504 (periodic activation control means).

Figure 12:
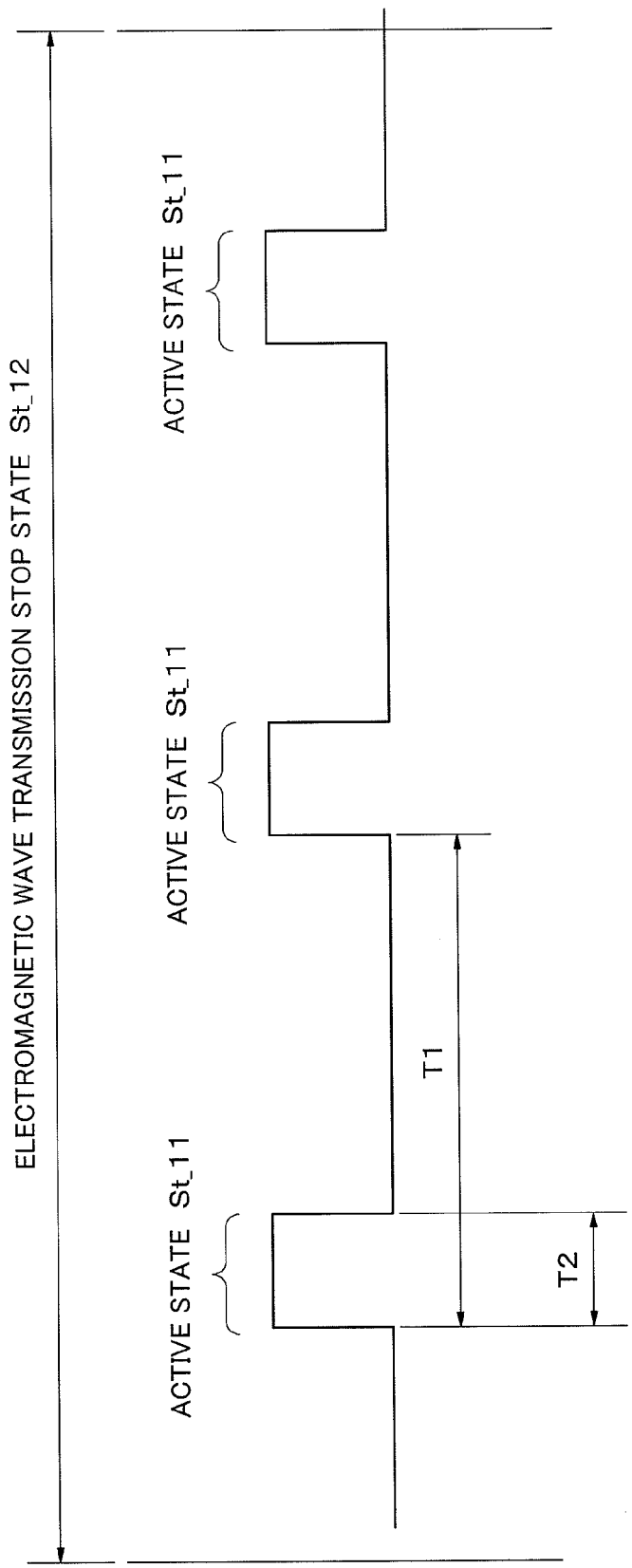
FIG. 12 is a timing chart for explaining an example of a periodic activation control of a periodic activation control block of which a base station shown in FIG. 11 is composed.

FIG. 12 is a timing chart for explaining an example of a periodic activation control of the periodic activation control block 504. When the base station 500 is in the electromagnetic wave transmission stop state St_12, the periodic activation control block 504 controls the transmission of the pilot signal for each predetermined cycle T1 during a predetermined period T2. Specifically, the periodic activation control block 504 controls the transmission power control section 364 to set the state of the base station 500 to the active state St_11. Further, the periodic activation control block 504 has predetermined time measurement means (not shown) and recognizes the above-mentioned cycle T1 and the elapse of the period T2 based on the time measurement result of the means.

In this period T2, the reception signal processing section 356 measures the traffic of the base station 500 for each unit time. Specifically, for example, the reception signal processing section 356 measures "the number of the mobile stations" that have established the connection to the base station 500 or "an amount of user data" in the mobile station that has established the connection to the base station 500 during the period T2. The reception signal processing 356 can update the traffic history 361 stored in the storage section 360 based on the measured traffic (for example, the newly measured data is added).

In the fourth exemplary embodiment described above, even when the base station 500 is in the electromagnetic wave transmission stop state St_12 for a long time, the state of the base station 500 is set to the active state St_11 periodically and the traffic is measured on those occasions. Therefore, the latest traffic situation can be reflected in the traffic history 361. Accordingly, the reliability of the traffic history 361 is increased and the reliability of the activation control of the base station 500 can be further improved.

Further, when the traffic measured during the period T2 exceeds the predetermined threshold value, the control section 502 can maintain the state of the base station 500 in the active state St_11 without changing the state (namely, the periodic activation operation by the periodic activation control block 504 is released and the state is changed to the active state St_11 duly). The cycle T1 and the period T2 can be changed arbitrarily. For example, at least one of the cycle T1 and the period T2 may be adjusted according to load information on the base station adjacent to the base station 500.

[Fifth Exemplary Embodiment]

Figure 13:
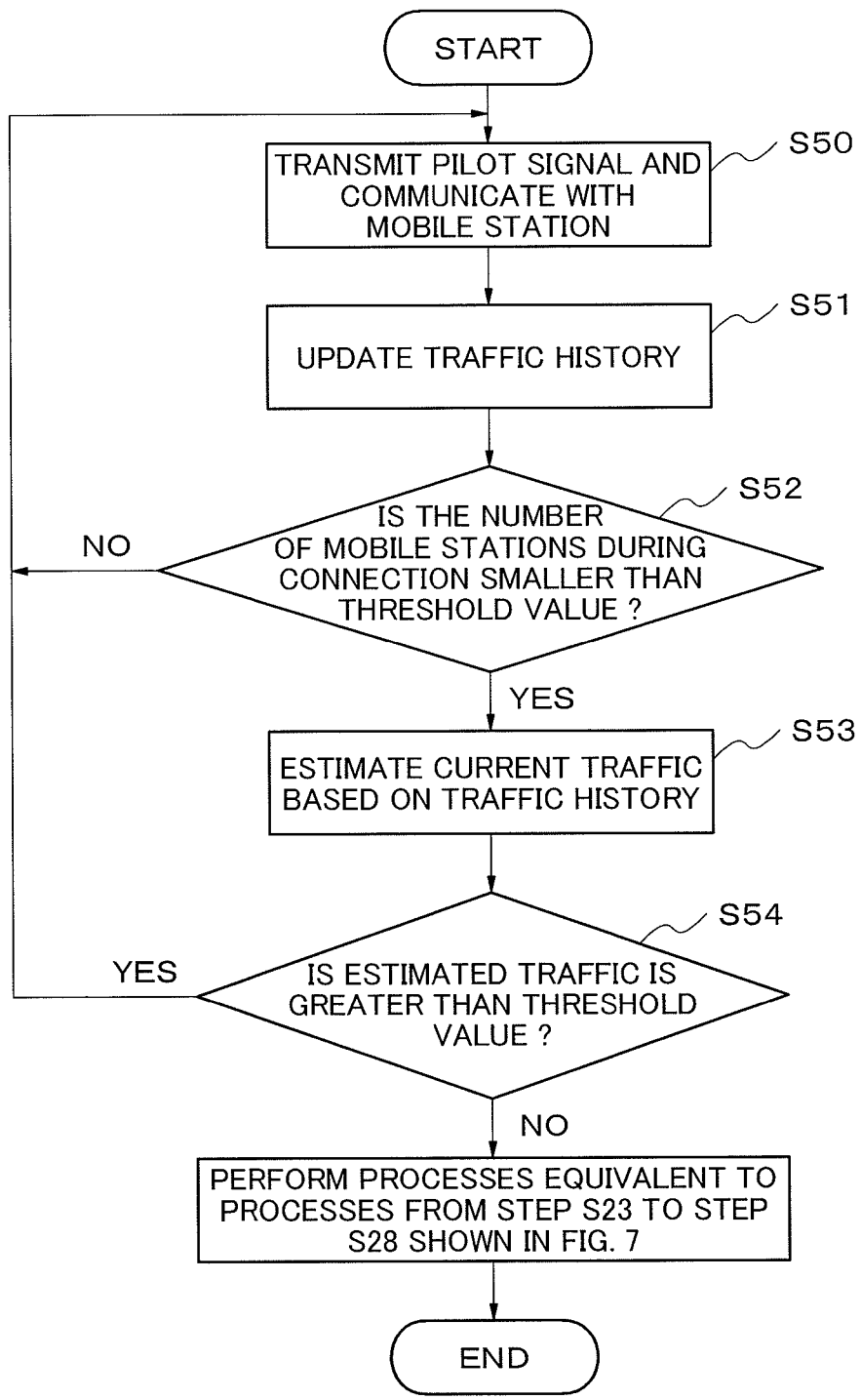
FIG. 13 is a flowchart for explaining an operation of a base station shown in FIG. 2 other than an operation shown in FIG. 7 when a state of the base station is changed from an active state to an electromagnetic wave transmission stop state in a fifth exemplary embodiment of the present invention.

FIG. 13 is a flowchart for explaining an example of an operation of a base station of which a wireless communication system of a fifth exemplary embodiment of the present invention is composed. In this exemplary embodiment, the configuration of the wireless communication system and the configuration of the base station of which the wireless communication system is composed are the same as that of the wireless communication system (refer to FIG. 2) and that of the base station (refer to FIG. 3) of the second exemplary embodiment, respectively. Therefore, the description about the configuration of them will be omitted. On the other hand, the operation of the wireless communication system and the operation of the base station are different from that of the wireless communication system and that of the base station of the second exemplary embodiment, respectively. Therefore, the following explanation will be mainly made with respect to the different part of the operation.

To be more specific, the flowchart shown in FIG. 13 is a flowchart for explaining an example of the operation of the base station 1 when the state of the base station 1 is changed from the active state St_11 to the electromagnetic wave transmission stop state St_12. A time at which the process shown in the flow is called in the base station 1 is a time at which the state of the base station 1 has been changed to the active state St_11

In the active state St_11, the transmission signal processing section 358 of the base station 1 transmits the pilot signal to the mobile station located in the cell 11 via the RF section 352 at a predetermined power and on the other hand, the reception signal processing section 356 receives the predetermined signal from the mobile station located in the cell 11 via the RF section 352 (step S50). The reception signal processing section 356 measures the traffic of the base station 1 for each unit time and updates the traffic history 361 stored in the storage section 360 based on the measured traffic (for example, the newly measured data is added) (step S51). Additionally, the reception signal processing section 356 determines whether or not the number of the mobile stations connecting to the base station 1 is smaller than the predetermined threshold value (step S52) and transmits the determination result to the control section 362. When the number of the mobile stations connecting to the base station 1 is greater than the predetermined threshold value ("No" determination in step S52), the control section 362 maintains the operation state of the base station 1 in the active state St_11.

On the other hand, when the number of the mobile stations connecting to the base station 1 is smaller than the predetermined number ("Yes" determination in step S52), the control section 362 estimates the current traffic in the vicinity of the base station 1 based on the traffic history 361 (step S53). The control section 362 determines whether or not the estimated traffic exceeds the predetermined threshold value (step S54).

When the estimated traffic is lower than the predetermined threshold value ("No" determination in step S54), the processes that are equivalent to the processes from step S23 to step S28 shown in FIG. 7 are performed. Namely, schematically speaking, a process in which the state of the base station 1 is changed to the electromagnetic wave transmission stop state St_12 is performed. On the other hand, when the estimated traffic exceeds the predetermined threshold value ("Yes" determination in step S54), the control section 362 maintains the operation state of the base station 1 in the active state St_11.

By the way, there is a case in which in the wireless communication system, the number of the mobile stations connecting to the base station decreases for a moment (for example, it decreases for a moment and then increases in a short time). When a control in which when the number of the mobile stations connecting to the base station is equal to or smaller than the threshold value, the state of the base station is immediately changed to the electromagnetic wave transmission stop state St_12 is performed, the activation control of the base station (that is, the control of transition between the active state St_11 and the electromagnetic wave transmission stop state) is frequently performed in response to the above-mentioned rapid traffic change. Therefore, there is a risk in which the power consumption of the base station rather increases.

In contrast, in the fifth exemplary embodiment described above, even if the number of the mobile stations connecting to the base station 1 is equal to or smaller than the predetermined threshold value, when the base station 1 determines that it is instantaneous (unexpected) from the past tendency, the change to the electromagnetic wave transmission stop state St_12 is not performed and the active state St_11 is maintained. Namely, in the fifth exemplary embodiment, the activation control of the base station is not frequently performed more than necessary. Additionally, in the fifth exemplary embodiment, the state of the base station is maintained in the active state St_11 so as not to extremely increase the power consumption. Accordingly, for example, when the base station 1 is provided as a base station for covering a cell edge of another base station, the base station 1 is in the active state St_11 as mentioned above. Therefore, the communication of the mobile station located in the vicinity of the cell edge is certainly secured.

Further, in this exemplary embodiment, it has been explained that when the number of mobile stations connecting to the base station is smaller than the predetermined threshold value and the current traffic in the vicinity of the base station 1 that is estimated based on the traffic history 361 is smaller than the predetermined threshold value, the state of the base station 1 is changed from the active state St_11 to the electromagnetic wave transmission stop state St_12. However, a condition of the state transition in the base station 1 is not limited to this. For example, a determination value for performing the transition can be generated by performing weighted averaging of the number of mobile stations actually connecting to the base station and the estimated current number of mobile stations (traffic). A control in which when the determination value is smaller than the predetermined threshold value, the state of the base station 1 is changed from the active state St_11 to the electromagnetic wave transmission stop state St_12 and on the other hand, when the determination value exceeds the above-mentioned threshold value, the state of the base station 1 is maintained in the active state St_11 can be used.

[Sixth Exemplary Embodiment]

Figure 14:
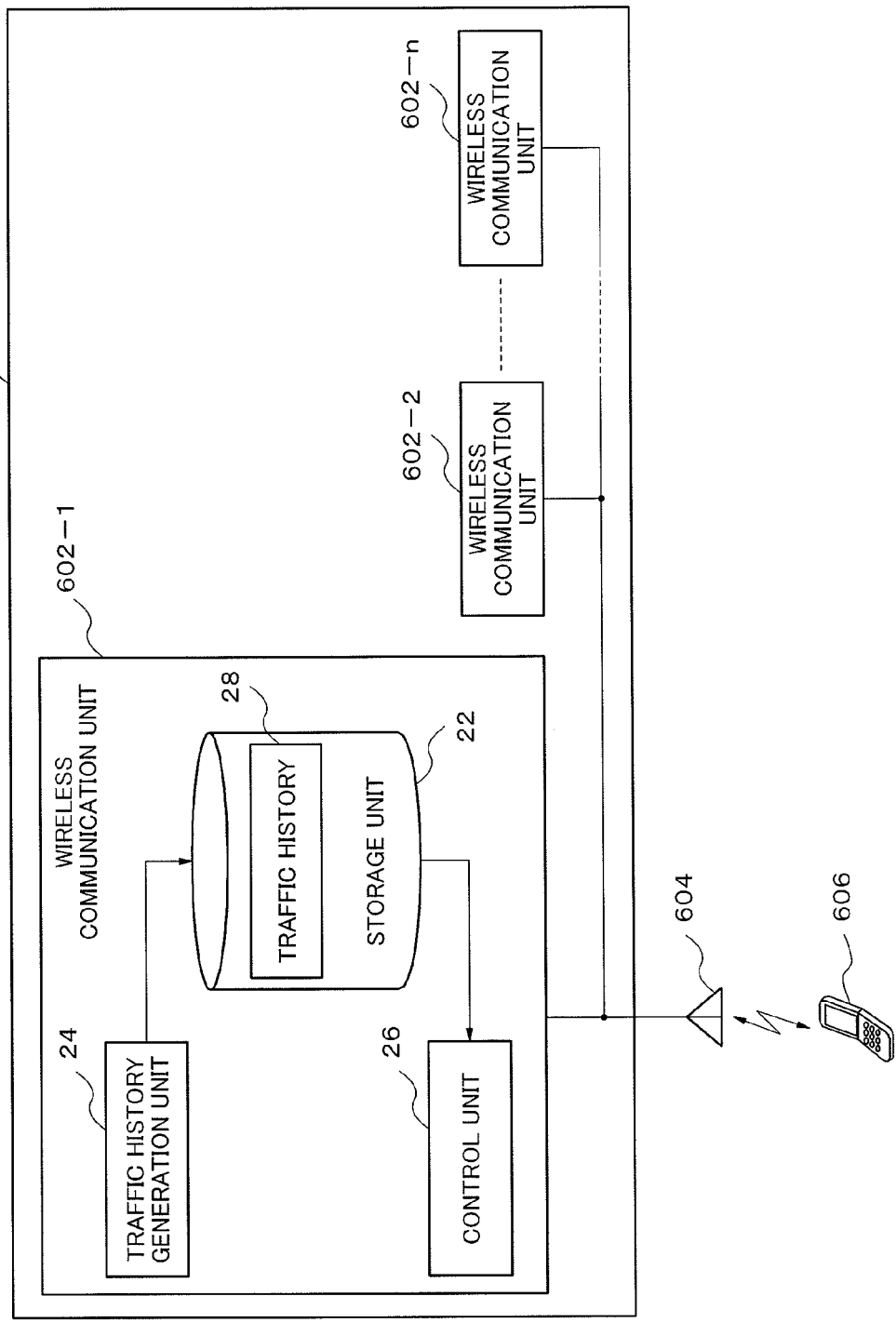
FIG. 14 is a block diagram for explaining an example of a configuration of a base station of which a wireless communication system according to a sixth exemplary embodiment of the present invention is composed.

FIG. 14 is a block diagram for explaining an example of a configuration of a base station 600 of which a wireless communication system according to a sixth exemplary embodiment of the present invention is composed. The base station 600 has a plurality of wireless communication units 602-1 to 602-n. Each of the wireless communication units 602-1 to 602-n performs wireless communication with a mobile station 606 via an antenna 604. Each of the wireless communication units 602-1 to 602-n is provided for each wireless frequency band in which the base station 600 performs communication. For example, the wireless communication unit 602-1 performs communication in 1.7 GHz band and the wireless communication unit 602-2 performs communication in 2 GHz band.

Each of the wireless communication units 602-1 to 602-n has a configuration equivalent to the configuration of the base station 20 of the first exemplary embodiment shown in FIG. 1. In other words, each of the wireless communication units 602-1 to 602-n includes at least the storage section 22, the traffic history generation section 24, and the control section 26. Each traffic history generation section 24 measures the traffic of the wireless communication units 602-1 to 602-n for each unit time and stores it in the storage section 22 as the traffic history 28. Each control section 26 controls the transmission of the control signal in each of the wireless communication units 602-1 to 602-n based on the traffic history 28. For example, a control in which when the current traffic estimated based on the traffic history 28 is higher than a predetermined value, the plurality of wireless communication units among the wireless communication units 602-1 to 602-n are activated (in other words, the transmission of the pilot signal is started) and on the other hand, when the estimated current traffic is lower than the predetermined value, for example, only the wireless communication unit 602-1 is activated or all the wireless communication units 602-1 to 602-n are not activated is performed.

In the sixth exemplary embodiment described above, the plurality of wireless communication units 602-1 to 602-n are provided and the above-mentioned wireless communication units are individually controlled according to the current traffic estimated based on the traffic history 28. Therefore, when many mobile stations which cannot be accommodated by one wireless communication unit are accommodated or when the amount of user data exceeds an amount that can be transmitted/received by one wireless communication unit, by activating the necessary number of wireless communication units, a control can be more carefully performed and the communication can be performed without consuming the electric power more than necessary.

Further, in the above-mentioned description, it has been explained that each of the wireless communication units 602-1 to 602-n has a configuration that is the same as that of the base station 20 of the first exemplary embodiment. However, the configuration of the wireless communication units 602-1 to 602-n is not limited to this. For example, the configuration of the third exemplary embodiment (especially, the configuration that includes the "periodicity detection means"/refer to FIG. 9) or the configuration of the fourth exemplary embodiment (especially, the configuration that includes the "periodic activation control means"/refer to FIG. 11) described above can be used for the configuration of the wireless communication units 602-1 to 602-n.

In the above-mentioned description, it has been explained that the storage section 22 is provided for each of the wireless communication units 602-1 to 602-n. However, one storage section can be shared with all the wireless communication units 602-1 to 602-n.

[Seventh Exemplary Embodiment]

Figure 15:
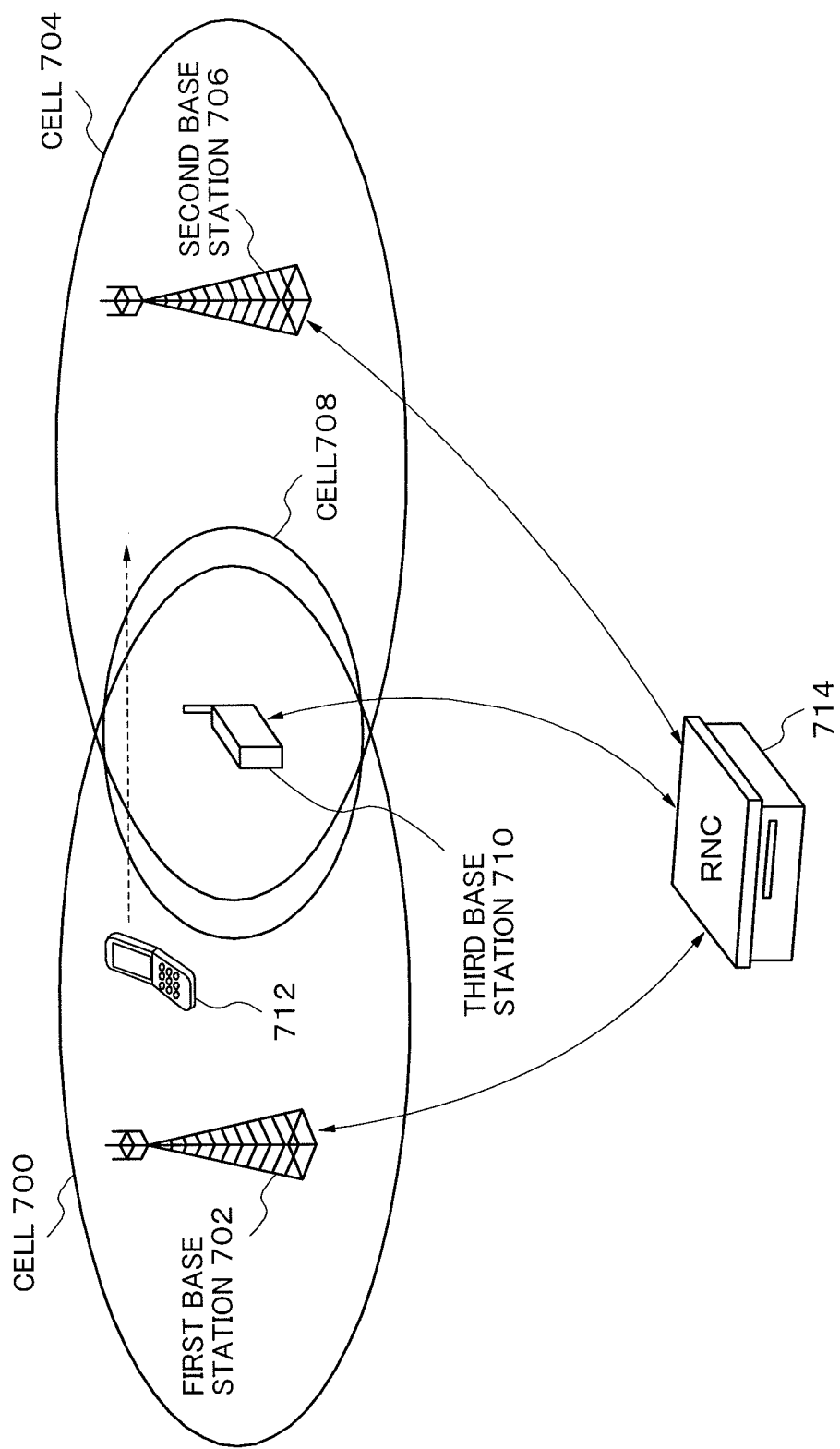
FIG. 15 is a view showing a configuration of an example of a wireless communication system according to a seventh exemplary embodiment of the present invention.

FIG. 15 is a view showing a configuration of an example of a wireless communication system according to a seventh exemplary embodiment of the present invention. The wireless communication system basically includes a first base station 702 having a cell 700 and a second base station 706 having a cell 704, wherein at least the cell 700 and a part of the cell 704 overlap each other. A third base station 710 having a cell 708 is provided in the above-mentioned overlap region. Further, the wireless communication system has at least one mobile station 712. The mobile station 712 performs wireless communication with the first base station 702, the second base station 706, and the third base station 710. The first base station 702, the second base station 706, and the third base station 710 are managed by an RNC 714. When a plurality of mobile stations exist in the overlap region of the cell 700 and the cell 704, the number of times of handover of the mobile station between the first base station 702 and the second base station 706 will increase. The RNC 714 holds the number of times of handover of the mobile station 712 from the first base station 702 to the second base station 706 and/or the number of times of handover from the second base station 706 to the first base station 702. For example, the RNC 714 holds the number of times of handover per unit time. Here, "the number of times of handover" means for example, the number of times at which the handover is tried in a fixed amount of time or the number of times at which the handover succeeds.

As shown in FIG. 5, the state of the third base station 710 is changed between the active state St_11 and the electromagnetic wave transmission stop state St_12 like the base station 1 of the second exemplary embodiment.

Figure 16:
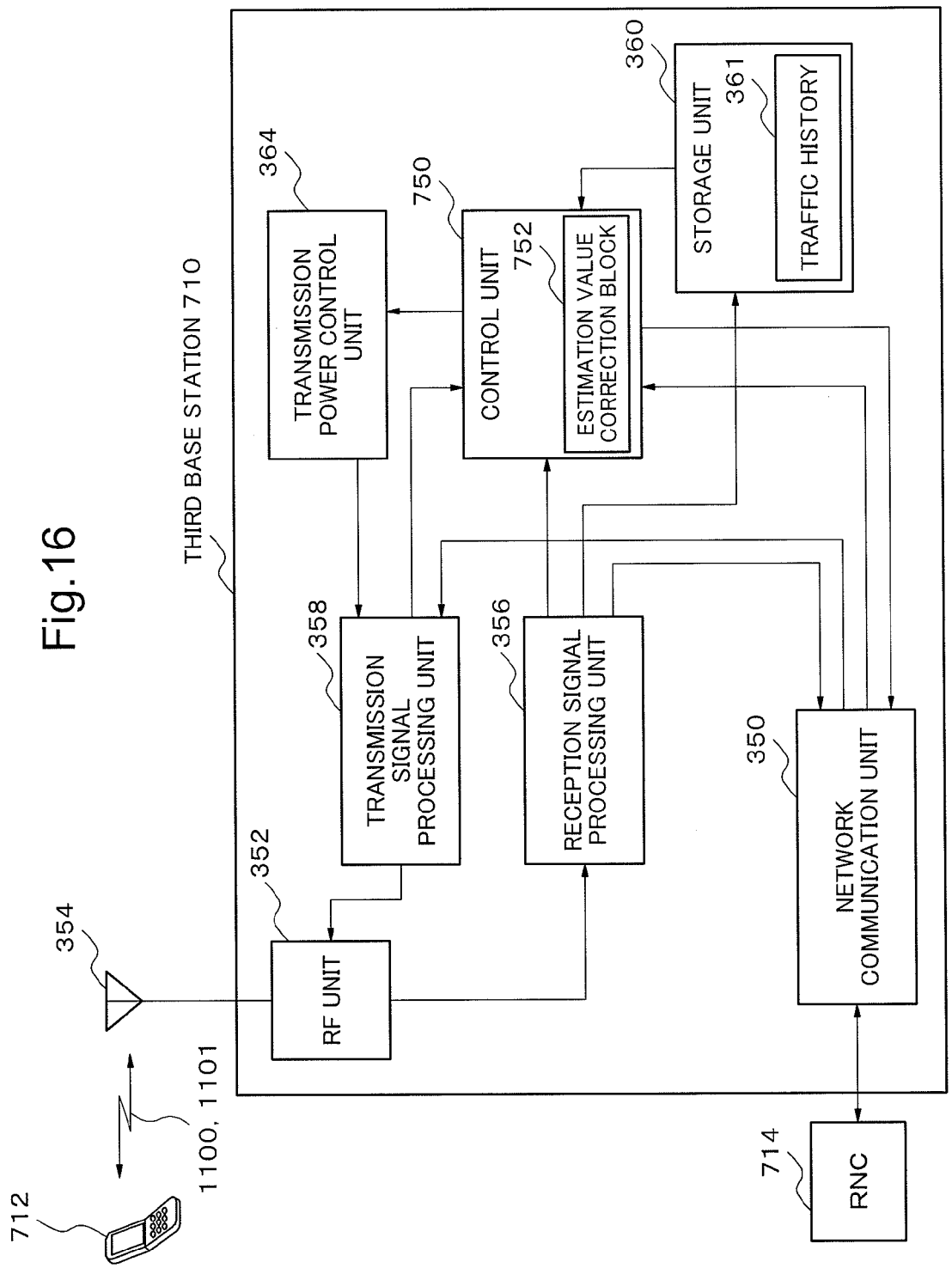
FIG. 16 is a block diagram for explaining an example of a configuration of a third base station shown in FIG. 15.

FIG. 16 is a block diagram for explaining an example of a configuration of the third base station 710 shown in FIG. 15. A configuration of a control section 750 of the third base station 710 is different from the configuration of the control section 362 of the base station 1 of the second exemplary embodiment shown in FIG. 3. This is a difference between third base station 710 of this exemplary embodiment and the base station 1 of the second exemplary embodiment. A configuration and an operation of each of constituent elements other than this control section 750, that are the network communication section 350, the RF section 352, the antenna 354, the reception signal processing section 356, the transmission signal processing section 358, the storage section 360, and the transmission power control section 364 in the base station 710, are the same as those of each of constituent elements other than the control section 362 of the base station 1 shown in FIG. 3. Therefore, the description of them will be omitted.

The control section 750 has an estimation value correction block 752 (estimation value correction means). The estimation value correction block 752 acquires the number of times of handover mentioned above (for example, the number of times at which the handover from the first base station 702 to the second base station 706 succeeds) from the RNC 714 via the network communication section 350. The estimation value correction block 752 corrects the current traffic in the vicinity of the third base station 710 that is estimated from the traffic history 361 by the control section 750 based on the acquired number of times of handover. The control section 750 determines whether or not the estimated traffic that is corrected by the estimation value correction block 752 exceeds the predetermined threshold value. When the estimated traffic that is corrected exceeds the predetermined threshold value, the control section 750 sets the state of the base station 710 to the active state St_11.

As described above, in the seventh exemplary embodiment, the estimated value (in this case, the estimated current traffic in the vicinity of the third base station 710 that is the base station which performs the activation control) is corrected by using real time data (in this case, the current number of times of handover) that reflects the current traffic of the third base station 710 and whereby, the reliability of the estimated value is improved. Therefore, the reliability of the activation control of the third base station 710 can be further improved.

Further, as an example of the correction of the estimated traffic, for example, a method in which the number of times of handover is multiplied by a predetermined coefficient (multiplied by a predetermined weight) and the calculation result is added to the estimated traffic can be used.

In the seventh exemplary embodiment, it has been explained that the third base station 710 is provided in the overlap region of the cell 700 of the first base station 702 and the cell 704 of the second base station 706. However, when the cell of the first base station 702 is divided into a plurality of sectors (for example, when a three sector configuration is used in which the cell is divided into three sectors, each sector has a central angle of 120 degrees, by an antenna directivity control), the third base station 710 can be provided at a sector boundary so that the cell 708 of the third base station 710 and the sectors overlap each other. In this case, the estimation value correction block 752 corrects the current traffic in the vicinity of the third base station 710 that is estimated from the traffic history 361 by using the number of times of handover between the sectors in the cell 700, wherein the sectors and the cell 708 overlap each other. In this case, the number of times of handover between the sectors is held by the first base station 702 or the RNC 714 and the estimation value correction block 752 acquires it via the network communication section 350.

[Eighth Exemplary Embodiment]

Figure 17:
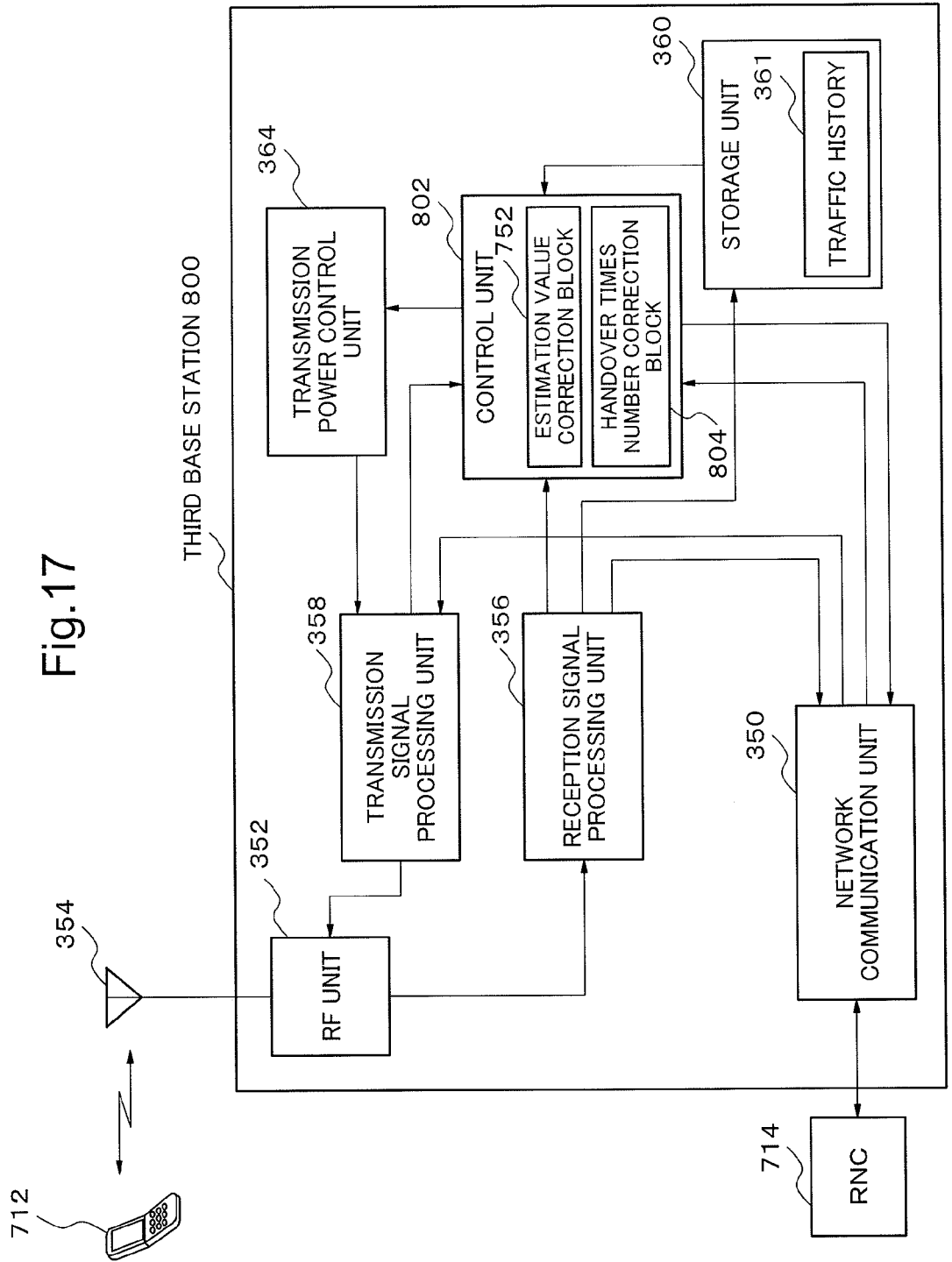
FIG. 17 is a block diagram for explaining an example of a configuration of a third base station of which a wireless communication system according to an eighth exemplary embodiment of the present invention is composed.

FIG. 17 is a block diagram for explaining an example of a configuration of a third base station 800 of which a wireless communication system according to an eighth exemplary embodiment of the present invention is composed. The wireless communication system is equivalent to the wireless communication system of the seventh exemplary embodiment (refer to FIG. 15). A configuration of a control section 802 of the third base station 800 of this exemplary embodiment is different from the configuration of the control section 750 of the third base station 710 of the seventh exemplary embodiment shown in FIG. 16. This is a difference between the third base station 800 of this exemplary embodiment and the third base station 710 of the seventh exemplary embodiment.

The control section 802 further includes a handover times number correction block 804 (handover times number correction means). The handover times number correction block 804 corrects the number of times of handover that is acquired from the RNC 714 via the network communication section 350 by the estimation value correction block 752.

Figure 18:
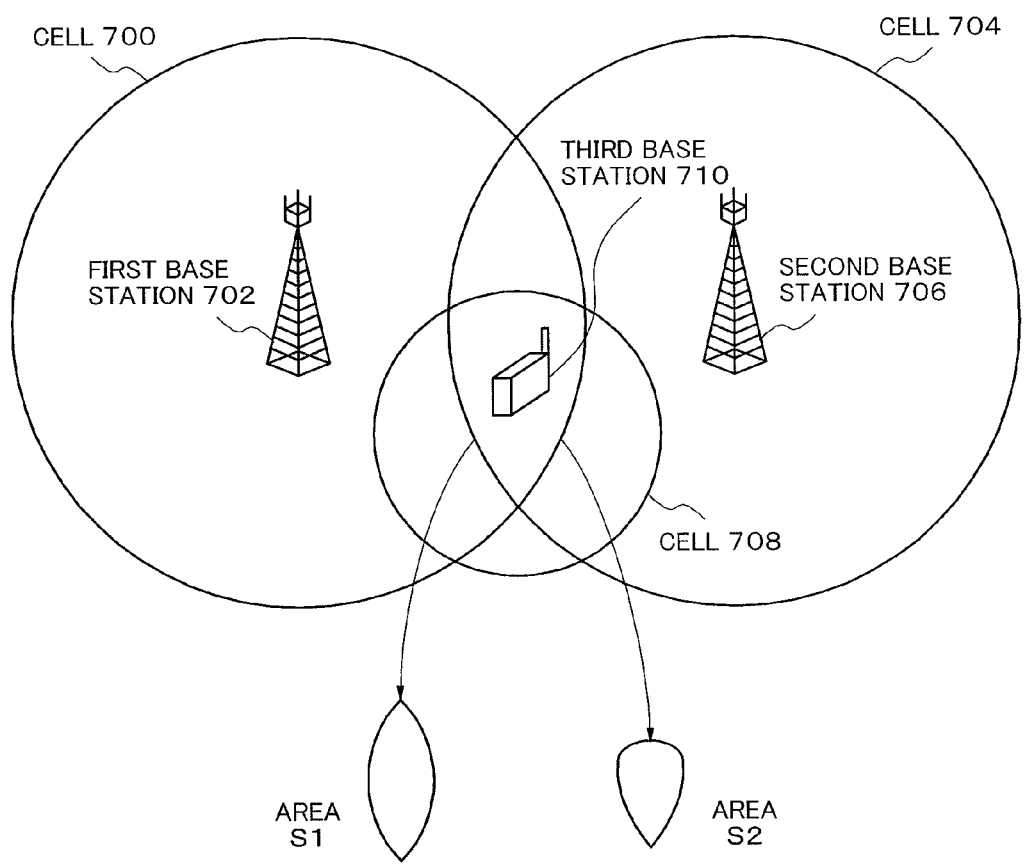
FIG. 18 is a conceptual diagram of a process in which the number of times of handover is corrected in a handover times number correction block shown in FIG. 17.

FIG. 18 shows a conceptual diagram of a process in which the number of times of handover is corrected in the handover times number correction block 804.

In FIG. 18, an area S1 shows an area of a region in which the cell 700 of the first base station 702 and the cell 704 of the second base station 706 overlap each other. An area S2 shows an area of a region in which the above-mentioned overlap region and the cell 708 of the third base station 800 overlap each other.

Here, the area S1 is regarded as the total number of handovers, that is a value corresponding to the number of handovers that can be covered between the first base station 702 and the second base station 706. In this case, the area S2 is regarded as a value corresponding to the number of handovers that can be covered by activating the third base station 800. Accordingly, the handover times number correction block 804 multiplies the number of times of handover that is acquired by the estimation value correction block 752 from the RNC 714 by for example, an area ratio (S2/S1) and uses the calculation result as "the corrected number of times of handover" in the third base station 800.

The estimation value correction block 752 corrects the current traffic in the vicinity of the third base station 800 that is estimated from the traffic history 361 based on "the corrected number of times of handover" by the control section 802.

Further, the third base station 800 acquires the area S1 and the area S2 from for example, the RNC 714.

The third base station 800 holds position information (for example, coordinate information) of a neighboring base station (the first base station 702 and the second base station 706), cell information (cell radius information) on each neighboring base station, or the like in advance or acquires it from the RNC 714 and can calculate the area S1 and the area S2 by using these information.

As described above, in the eighth exemplary embodiment, the mere number of times of handover is appropriately corrected to the number of handovers up to which the handover can be accommodated when the third base station 800 is activated. Namely, the accuracy of the corrected number of times of handover becomes higher. Therefore, the accuracy of the estimated traffic that is corrected by using such number of times of handover becomes higher. As a result, the reliability of the activation control of the third base station 800 can be further improved.

[Ninth Exemplary Embodiment]

Figure 19:
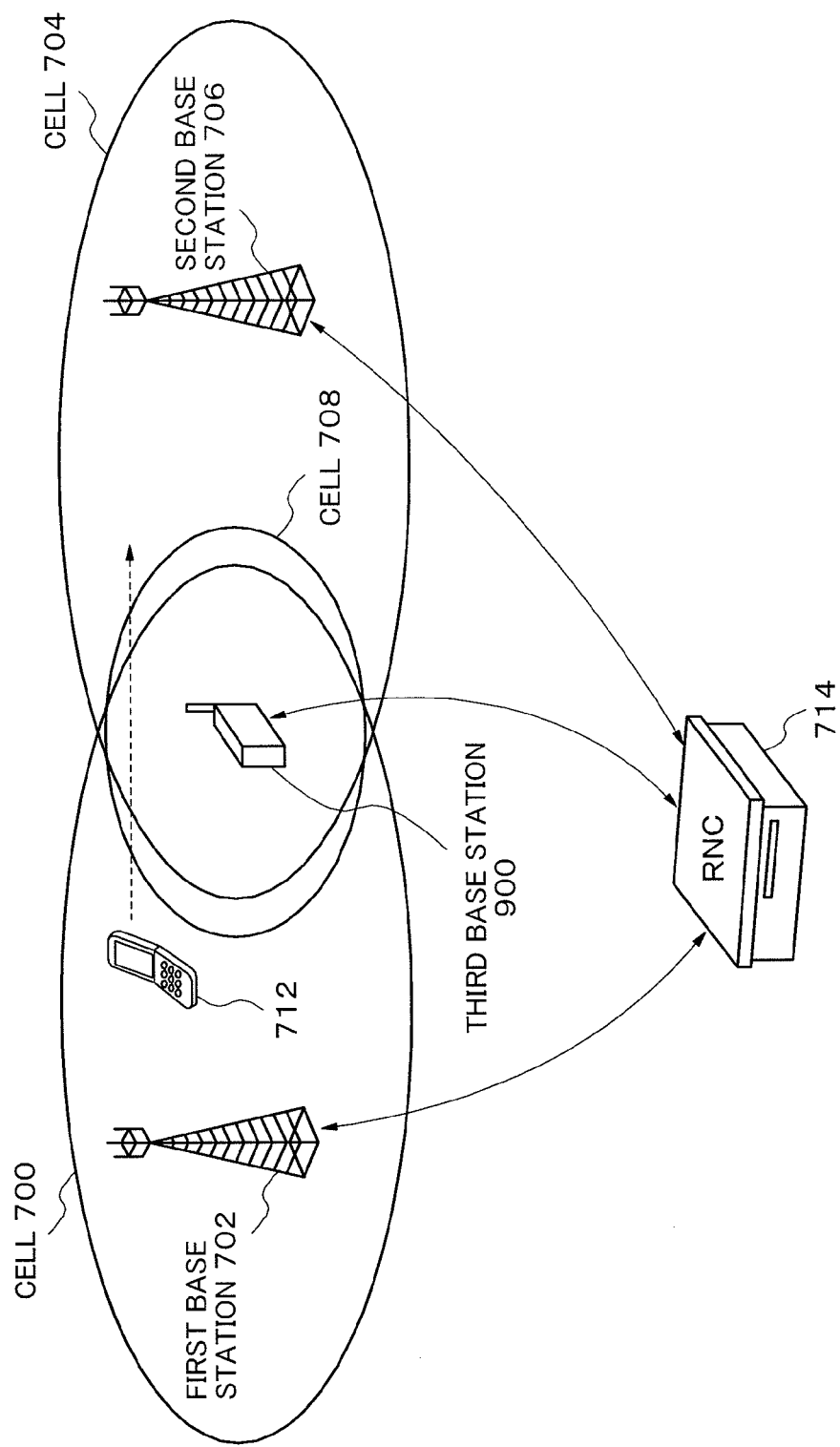
FIG. 19 is a view showing a configuration of an example of a wireless communication system according to a ninth exemplary embodiment of the present invention.

FIG. 19 is a view showing a configuration of an example of a wireless communication system according to a ninth exemplary embodiment of the present invention. The wireless communication system basically includes the first base station 702 having the cell 700 and the second base station 706 having the cell 704, wherein at least the cell 700 and a part of the cell 704 overlap each other. A third base station 900 having the cell 708 is provided in the above-mentioned overlap region. Further, the wireless communication system has at least one mobile station 712. The mobile station 712 performs wireless communication with the first base station 702, the second base station 706, and the third base station 900. The first base station 702, the second base station 706, and the third base station 900 are managed by the RNC 714. When a plurality of mobile stations exist in the overlap region of the cell 700 and the cell 704, the number of times of handover of the mobile station between the first base station 702 and the second base station 706 will increase. The RNC 714 holds the number of times of handover of the mobile station 712 from the first base station 702 to the second base station 706 and/or the number of times of handover of it from the second base station 706 to the first base station 702. For example, the RNC 714 holds the number of times of handover per unit time. Here, "the number of times of handover" means for example, the number of times at which the handover is tried in a fixed amount of time or the number of times at which the handover succeeds. Namely, the number of times of handover is real time data that reflects the current traffic of the third base station 900.

Figure 20:
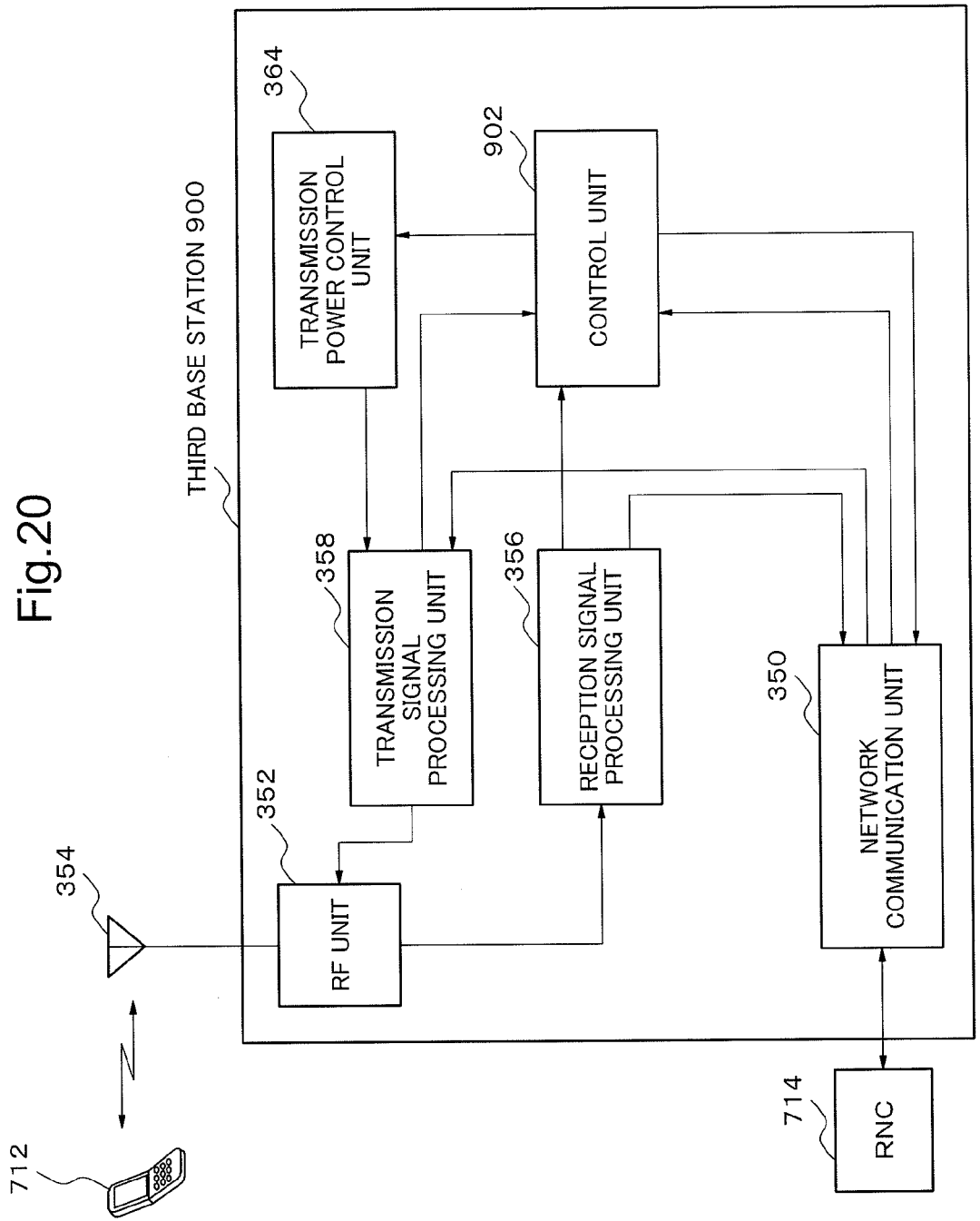
FIG. 20 is a block diagram for explaining an example of a configuration of a third base station shown in FIG. 19.

FIG. 20 is a block diagram for explaining an example of a configuration of the third base station 900 of which a wireless communication system shown in FIG. 19 is composed. The third base station 900 includes the network communication section 350, the RF section 352, the antenna 354, the reception signal processing section 356, the transmission signal processing section 358, the transmission power control section 364, and a control section 902. Here, a constituent element other the control unit 902 is the same as the constituent element of the base station 1 of the second exemplary embodiment shown in FIG. 3. Here, the control of the state transition between the active state St_11 and the electromagnetic wave transmission stop state St_12 in the third base station 900 is different from the control of the state transition of the base station 1 of the second exemplary embodiment. This will be described below.

The control section 902 controls the stop of the transmission of the pilot signal (in other words, the state of the third base station 900 is changed from the active state St_11 to the electromagnetic wave transmission stop state St_12) based on information from the reception signal processing section 356 for example, information about whether or not the number of the mobile stations connecting to the third base station 900 is smaller than the predetermined threshold value. Additionally, the control section 902 acquires the number of times of handover mentioned above (for example, the number of handover times at which the handover from the first base station 702 to the second base station 706 succeeds) from the RNC 714 via the network communication section 350 and controls the start of the transmission of the pilot signal based on the number of times of handover. For example, the control section 902 compares the number of times of handover with the predetermined threshold value and when the number of times of handover exceeds the predetermined threshold value, the control section 902 sets the state of the third base station 900 to the active state St_11.

As described above, in the ninth exemplary embodiment, the state transition control (in other words, the transmission control of the pilot signal) of the third base station 900 is performed based on the number of times of handover between the first base station 702 and the second base station 706 that are provided so that the cell 708 of the third base station 900 and the first base station 702/the second base station 706 overlap each other unlike the first to eighth exemplary embodiments. By this configuration, for example, even when enough traffic history cannot be collected because of a short period of the active state St_11 of the third base station 900 in the past and whereby the current traffic in the vicinity of the third base station 900 cannot be correctly estimated, the start of the transmission of the pilot signal can be controlled based on real time data (that is, the number of times of handover) without depending on the estimated value that is not accurate. Therefore, the reliability of the activation control of the third base station 900 is improved. As a result, the electric power consumed in the base station can be suppressed and the electromagnetic wave interference between the base stations can be avoided or suppressed.

[Tenth Exemplary Embodiment]

Figure 21:
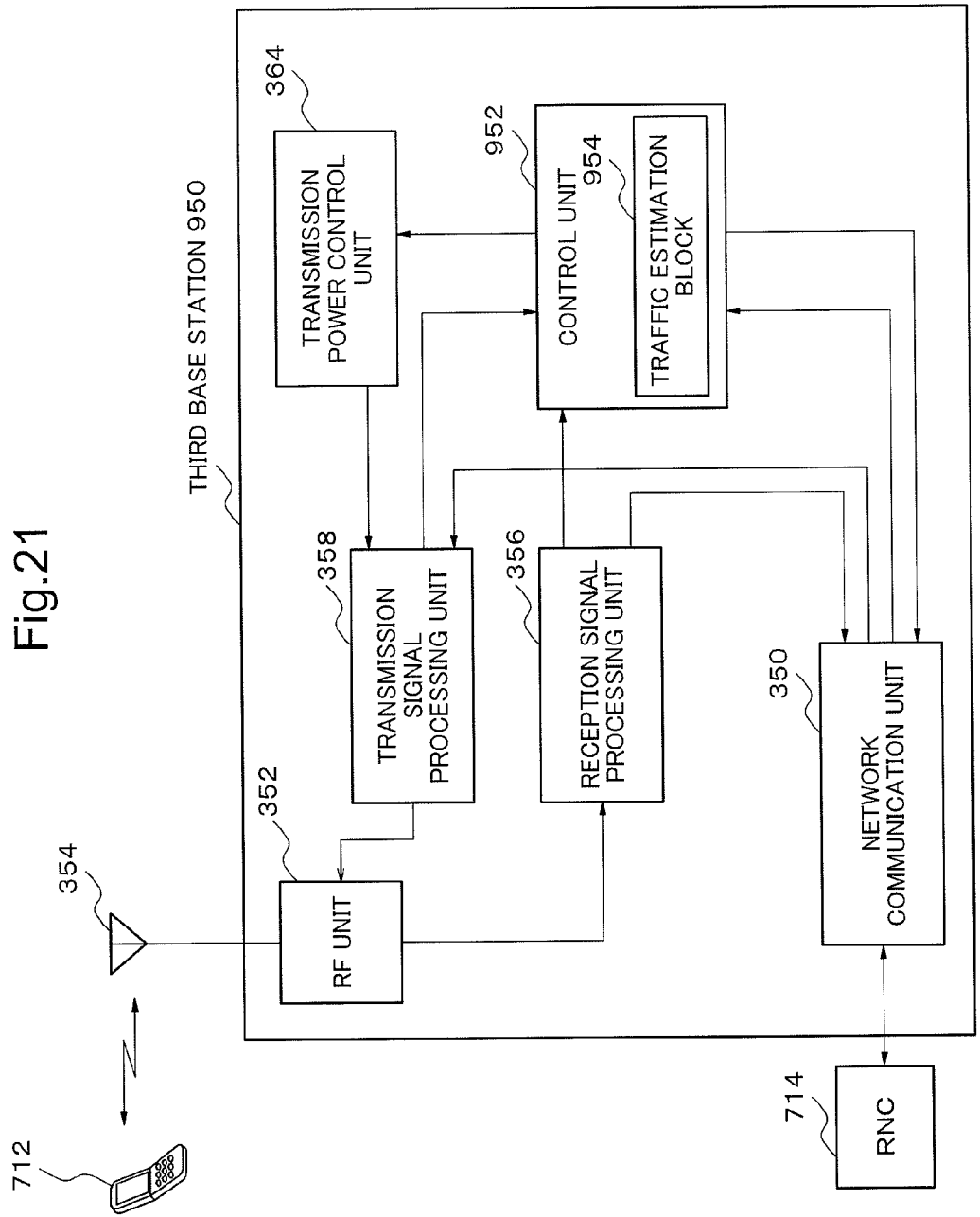
FIG. 21 is a block diagram for explaining an example of a configuration of a third base station of which a wireless communication system according to a tenth exemplary embodiment of the present invention is composed.

FIG. 21 is a block diagram for explaining an example of a configuration of a third base station 950 of which a wireless communication system according to a tenth exemplary embodiment of the present invention is composed. A configuration of a control section 952 of the third base station 950 is different from the configuration of the control section 902 of the third base station 900 of the ninth exemplary embodiment shown in FIG. 20. This is a difference between the third base station 950 of this exemplary embodiment and the third base station 900 of the ninth exemplary embodiment.

The control section 952 has a traffic estimation block 954 (traffic estimation means). The traffic estimation block 954 estimates the current traffic in the vicinity of the third base station 950 based on the number of times of handover mentioned above. The control section 952 compares the current traffic estimated based on the number of times of handover with the predetermined threshold value and when the traffic exceeds the predetermined threshold value, the control section 952 sets the state of the third base station 950 to the active state St_11.

A first, a second, and a third traffic estimation method in the traffic estimation block 954 will be described below.

The first traffic estimation method will be described. The third base station 950 holds the traffic history thereof and the number of times of the handover performed in the past. The traffic estimation block 954 calculates a ratio of the number of times of the handover performed in the past and the number of times of the handover performed at present and whereby it can estimate the current traffic from the past traffic.

Figure 22:
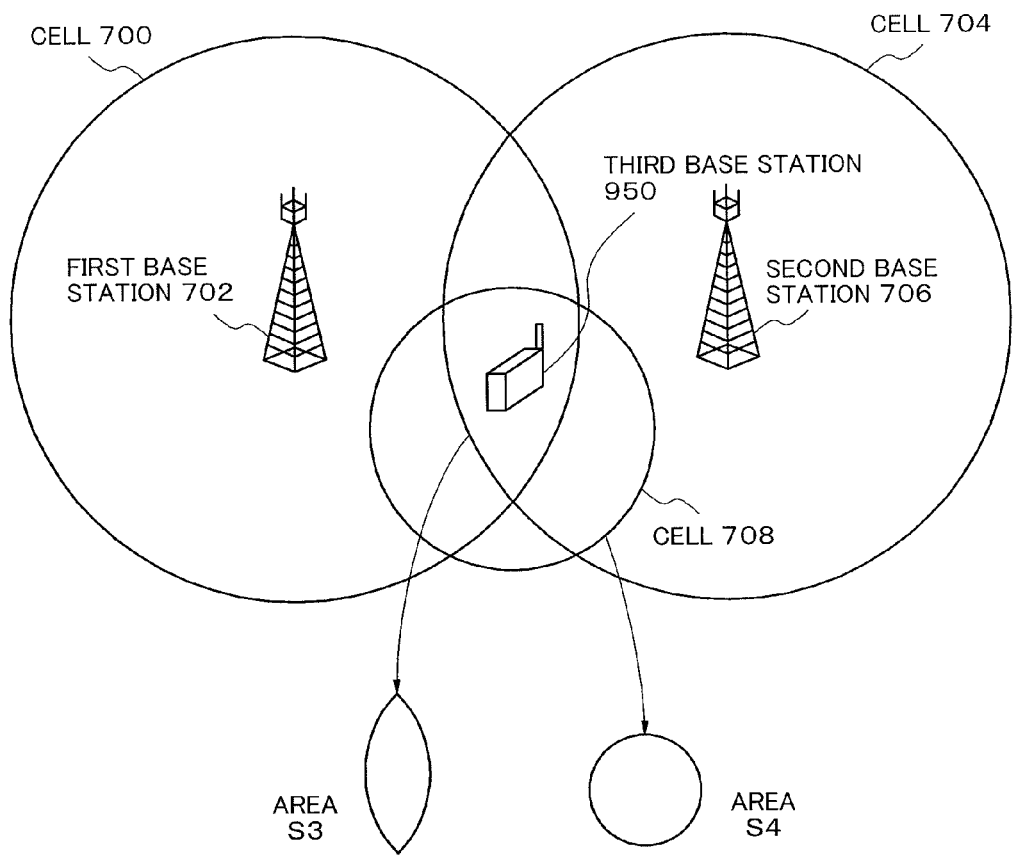
FIG. 22 is a conceptual diagram of a process of a second traffic estimation method in a third base station shown in FIG. 21.

FIG. 22 shows a conceptual diagram of a process of the second traffic estimation method. In FIG. 22, an area S3 shows an area of a region in which the cell 700 of the first base station 702 and the cell 704 of the second base station 706 overlap each other. An area S4 shows an area of a cover area of the third base station 950 (namely, it shows an area of the cell 708).

Here, the area S3 of the above-mentioned overlap region can be regarded as the total number of handovers, that is a value corresponding to the number of handovers that can be covered between the first base station 702 and the second base station 706. When it is assumed that the traffic per unit area in the above-mentioned overlap region is equal to the traffic per unit area in the area S4 of the cover area of the third base station 950, the traffic which can be accommodated by the activation of the third base station 950 can be estimated as "(the total number of handovers)*(S4/S3)".

Figure 23:
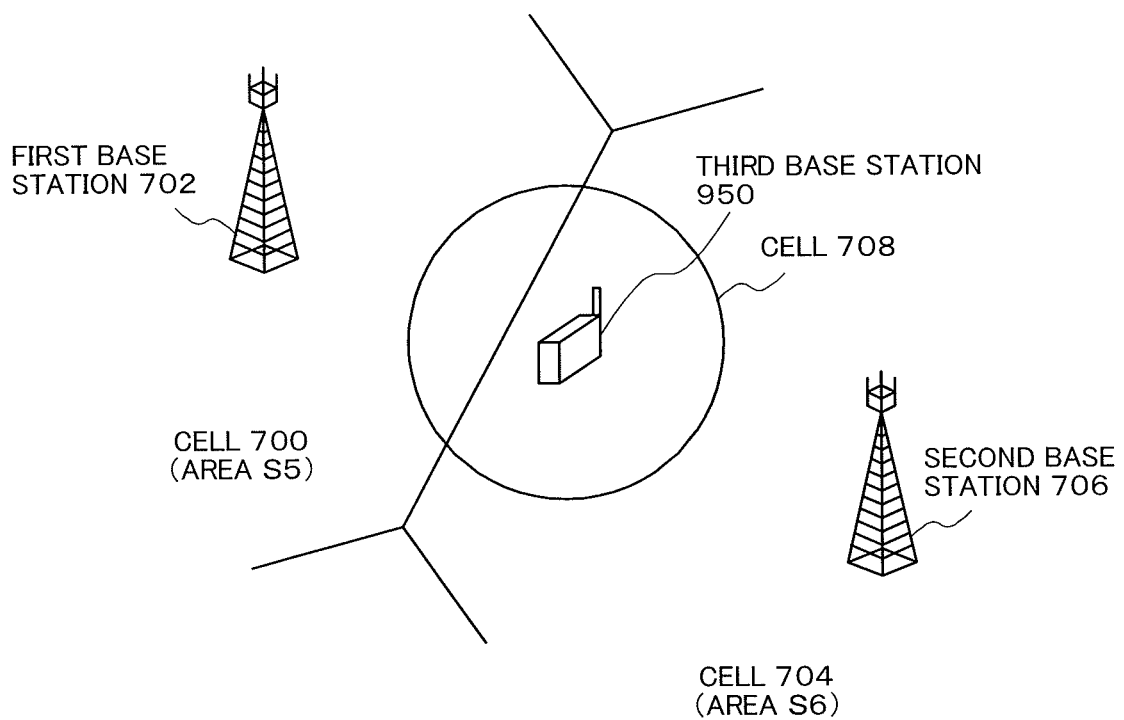
FIG. 23 is a conceptual diagram of a process of a third traffic estimation method in a third base station shown in FIG. 21.

FIG. 23 shows a conceptual diagram of a process of the third traffic estimation method. The cover area (the cell 708) of the third base station 950 is divided into two areas, one is an area dominated by the first base station 702 and the other is an area dominated by the second base station 706. The area of each dominant area is used as a weighting coefficient. By using this weighting coefficient, a value obtained by a weighted addition of the traffic of the first base station 702 and the traffic of the second base station 706 can be estimated as the current traffic of the third base station 950.

Further, the third base station 950 acquires information about the area S3 and the area S4 from for example, the RNC 714. Additionally, the third base station 950 holds position information (for example, coordinate information) of a neighboring base station (the first base station 702 and the second base station 706), cell information (cell radius information) on each neighboring base station, or the like in advance or acquires it from the RNC 714, and can calculate the area S3 and the area S4 by using these information.

Further, it is possible to combine the first to eighth exemplary embodiments (that is, the base station which controls the transmission of the control signal based on the traffic history thereof) and the ninth and tenth exemplary embodiments (that is, the base station which controls the transmission of the control signal based on the number of times of handover). For example, the base station that is a target of the activation control has the above-mentioned two kinds of transmission control functions and the transmission control of high precision can be selected according to an operation status.

[Modification Example]

In the first to tenth exemplary embodiments described above, a function allocation of each constituent element inside the base station which performs the activation control (the transmission control of the control signal (pilot signal)) is not necessarily limited to the function allocation described in each above-mentioned exemplary embodiment. Therefore, the current constituent element may be divided or integrated arbitrarily. Further, a function of one constituent element can be moved to the other constituent element. For example, in the base station 1 shown in FIG. 3, the reception signal processing section 356 and the transmission signal processing section 358 can be integrated and the integrated section can be used as "a transmission/reception signal processing section". Namely, this "transmission/reception signal processing section" performs the function of the reception signal processing section 356 and the function of the transmission signal processing section 358. Namely, the base station including this "transmission/reception signal processing section" has the same performance as the base station 1 shown in FIG. 3. Although the description is repeated, the function allocation and the name of the constituent element of each base station in each above-mentioned exemplary embodiment are shown as an example. Therefore, the function allocation and the name can be arbitrarily changed without being restricted by the above-mentioned exemplary embodiment.

In the second to tenth exemplary embodiments described above, an explanation has been given for the case in which the pilot signal is used as the control signal. However, it is not limited to the pilot signal and a signal for reporting cell-specific information or system-specific information may be used.

Additionally, in the first to tenth exemplary embodiments described above, although it has been explained that the base station has one-to-one correspondence with the cell, one base station can have a plurality of cells. In the case, the base station can perform the state transition control for each cell.

In the first to tenth exemplary embodiments described above, the RNC 200 is not necessarily an essential constituent element. For example, a configuration in which each of the base stations (for example, the base stations 1, 20, 400, 500, 600, 710, 800, 900, and 950 described above) that is a target of the activation control and another base station located in the vicinity of the base station has a function of the RNC 200 may be used. In the case, the base station that is the target of the activation control is directly connected to the above-mentioned another base station via the predetermined communication network (for example, a wired communication network). In this case, for example, a method in which when the operation state of the base station that is the target of the activation control has been changed to the active state, it directly notifies the above-mentioned another base station instead of reporting to the RNC 200 in order to change the measurement cell set can be used.

Further, in the first to tenth exemplary embodiments described above, although it has been explained that the above-mentioned another base station adds the cell of the base station that is set to the active state and is the target of the activation control to the measurement cell set and instructs the mobile station to perform the measurement of the cell, these processes can be omitted. In the case, the mobile station may independently measure the received power of the pilot signal, receive discrimination information of the cell from the control signal of the cell or perform another operation, and report the received power of the pilot signal together with a discrimination number of the cell.

Further, in the first to tenth exemplary embodiments described above, it has been explained that each base station is controlled by dedicated hardware. However, a configuration in which these base stations are controlled by a not-illustrated computer circuit (for example, CPU (Central Processing Unit)) based on a control program and operated may be used.

The invention of the present application has been described with reference to the exemplary embodiment above. However, the invention of the present application is not limited to the above-mentioned exemplary embodiment. Various changes in configuration of the invention of the present application and details understood by those skilled in the art can be made without departing from the scope of the invention of the present application.

This application claims priority based on Japanese Patent Application No. 2009-073049 filed on Mar. 25th, 2009 and the disclosure of which is hereby incorporated in its entirety.

Description of Symbol 1, 20, 400, 500, 600 base station
22, 360 storage section
24 traffic history generation section
26, 362, 402, 502, 750, 802, 902, 952 control section
28, 261 traffic history
356 reception signal processing section
358 transmission signal processing section
364 transmission power control section
404 periodicity detection block
504 periodic activation control block
602-1 to 602-n wireless communication unit
702 first base station
706 second base station
710, 800, 900, 950 third base station
752 estimation value correction block
804 handover times number correction block
954 traffic estimation block

The invention claimed is:

1. A base station comprising:
   a storage section;
   a traffic history generation unit configured to measure a traffic of the base station for at least one predetermined time and store the measured traffic in the storage section as a traffic history;
   a control section configured to control transmission of a control signal based on the traffic history;
   a periodicity detection section configured to create a periodicity parameter regarding periodicity of a change in traffic based on the traffic history; and
   a periodic activation control section configured to transmit the control signal for a predetermined cycle when the base station stops the transmission of the control signal;
   wherein:
      the control section estimates a current traffic in a vicinity of the base station based on the traffic history when the base station is in a state in which a transmission of the control signal is stopped and starts to transmit the control signal when the current traffic exceeds a predetermined threshold value;
      the control section is configured to control the transmission of the control signal based on the periodicity parameter; and
      the traffic history generation section is configured to measure the traffic of the base station and store the measured traffic in the storage section as the traffic history while the base station is periodically activated by the periodic activation control section.

2. The base station according to claim 1 wherein the control section is configured to control the transmission of the control signal based on the number of the mobile stations connecting to the base station and the current traffic in the vicinity of the base station that is estimated from the traffic history.

3. The base station according to claim 2 wherein the control section is configured to continue to transmit the control signal when the current traffic in the vicinity of the base station that is estimated from the traffic history is equal to or greater than a predetermined threshold value.

4. The base station according to claim 1 further comprising: an estimation value correction section configured to acquire information on the number of times of handover of one of the mobile stations between a plurality of other base stations located in the vicinity of the base station or between sectors of the base station, and correct the traffic estimated from the traffic history by the control section based on the number of times of handover.

5. The base station according to claim 4 further comprising a handover times number correction section configured to correct the number of times of handover acquired by the estimation value correction section.

6. The base station according to claim 5 wherein the handover times number correction section is configured to correct the number of times of handover based on information on a cell overlap area between the plurality of other base stations.

7. A base station comprising:
   a storage section;
   a periodic activation control section configured to transmit a control signal for a predetermined cycle when the base station stops the transmission of the control signal; and
   a plurality of wireless communication sections configured to perform a communication process for each of a plurality of wireless frequency bands, each of the wireless communication sections including:
      a traffic history generation section configured to measure a traffic of one of the plurality of wireless communication means for at least one predetermined time and to store the measured traffic in the storage section as a traffic history;
      a control section configured to control transmission of the control signal based on the traffic history for each of the wireless communication sections; and
      a periodicity detection section configured to create a periodicity parameter regarding periodicity of a change in traffic based on the traffic history;
   wherein:
      the control section estimates a current traffic in a vicinity of the base station based on the traffic history for each of the wireless communication sections when the base station is in a state in which a transmission of the control signal is stopped and starts to transmit the control signal when the current traffic exceeds a predetermined threshold value; and the control section is configured to control the transmission of the control signal based on the periodicity parameter.

8. A method for controlling a base station comprising:
measuring a traffic of the base station for at least one predetermined time and storing the measured traffic as a traffic history;
controlling transmission of a control signal based on the traffic history;
creating a periodicity parameter regarding periodicity of a change in traffic based on the traffic history; and
controlling transmission of the control signal for a predetermined cycle when the base station stops the transmission of the control signal;
wherein:
the method for controlling the base station estimates a current traffic in a vicinity of the base station based on the traffic history when the base station is in a state in which a transmission of the control signal is stopped and starts to transmit the control signal when the current traffic exceeds a predetermined threshold value; and
the method for controlling the base station controls the transmission of the control signal based on the periodicity parameter.

9. A method for controlling a base station which includes a plurality of wireless communication sections configured to perform a communication process for each of a plurality of wireless frequency bands comprising:
measuring a traffic of one of the plurality of wireless communication means for at least one predetermined time and storing the measured traffic as a traffic history;
controlling transmission of a control signal based on the traffic history for each of the wireless communication sections;
creating a periodicity parameter regarding periodicity of a change in traffic based on the traffic history; and
controlling transmission of the control signal for a predetermined cycle when the base station stops the transmission of the control signal;
wherein:
the method for controlling the base station estimates a current traffic in a vicinity of the base station based on the traffic history for each of the wireless communication sections when the base station is in a state in which a transmission of the control signal is stopped and starts to transmit the control signal when the current traffic exceeds a predetermined threshold value; and
the method for controlling the base station controls the transmission of the control signal based on the periodicity parameter.

10. A method comprising:
measuring a traffic of a base station for at least one predetermined time and storing a measured traffic as a traffic history;
controlling transmission of a control signal based on the traffic history;
creating a periodicity parameter regarding periodicity of a change in traffic based on the traffic history;
controlling transmission of the control signal for a predetermined cycle when the base station stops the transmission of the control signal;
estimating a current traffic in a vicinity of the base station based on the traffic history when the base station is in a state in which a transmission of the control signal is stopped and starting to transmit the control signal when the current traffic exceeds a predetermined threshold value; and
controlling the transmission of the control signal based on the periodicity parameter.

11. A method for controlling a base station which includes a plurality of wireless communication sections configured to perform a communication process for each of a plurality of wireless frequency bands, the method comprising:
measuring a traffic of the wireless communication sections for at least one predetermined time and storing the measured traffic as a traffic history;
controlling transmission of a control signal based on the traffic history for each of the wireless communication sections;
creating a periodicity parameter regarding periodicity of a change in traffic based on the traffic history;
controlling transmission of the control signal for a predetermined cycle when the base station stops the transmission of the control signal:
estimating a current traffic in a vicinity of the base station based on the traffic history for each of the wireless communication sections when the base station is in a state in which a transmission of the control signal is stopped and starting to transmit the control signal when the current traffic exceeds a predetermined threshold value; and
controlling the transmission of the control signal based on the periodicity parameter.

* * * * *